US005774251A

United States Patent [19]
Sekikawa

[11] Patent Number: 5,774,251
[45] Date of Patent: Jun. 30, 1998

[54] OPTICAL SCANNING APPARATUS

[75] Inventor: Yoshihito Sekikawa, Saitama, Japan

[73] Assignee: Fuji Xerox Co., Ltd., Tokyo, Japan

[21] Appl. No.: 740,128

[22] Filed: Oct. 24, 1996

Related U.S. Application Data

[62] Division of Ser. No. 574,032, Dec. 18, 1995.

[30] Foreign Application Priority Data

Dec. 19, 1994 [JP] Japan .................................. 6-315091
Dec. 29, 1994 [JP] Japan .................................. 6-315089

[51] Int. Cl.$^6$ .................................................. G02B 26/08
[52] U.S. Cl. ........................... 359/216; 359/205; 359/217
[58] Field of Search ................................. 359/216–219, 359/205–207; 347/258–261

[56] References Cited

U.S. PATENT DOCUMENTS 4,875,748   10/1989   Matsumoto et al. ..................... 359/216

FOREIGN PATENT DOCUMENTS 50-93719   7/1975   Japan .

Primary Examiner—James Phan
Attorney, Agent, or Firm—Finnegan, Henderson, Farabow, Garrett & Dunner, L.L.P.

[57] ABSTRACT

An optical scanning apparatus includes: a rotational polygonal mirror, on the side of which a plurality of reflecting surfaces are provided, the reflecting surfaces deflecting a beam of incident light in the primary scanning direction at a substantially equal angular velocity; a first optical system for forming a beam of light sent from the light source into an image long in the primary scanning direction in such a manner that the formed image strides over the plurality of deflecting surfaces; and an fθ lens for converging the beam of light deflected on the deflecting surface at a position close to the surface of the photoreceptor drum so that a spot of light irradiated on the photoreceptor drum can be moved at a substantially equal speed. In the optical scanning apparatus, the angles α and β satisfy the following expression:

$$(\cos((\beta+\alpha)\div 2))\div(\cos((\beta-\alpha)\div 2)) \geq 0.75$$

where α is the maximum deflection angle of the deflection luminous flux with respect to the optical axis of the θ lens, and β is an angle formed between the optical axis of the first optical system projected in the subsidiary scanning direction and the optical axis.

2 Claims, 17 Drawing Sheets

OPTICAL SCANNING APPARATUS

This is a division of application Ser. No. 08/574,032, filed Dec. 18, 1995, pending.

BACKGROUND OF THE INVENTION

The present invention relates to an optical scanning apparatus used for an image recording apparatus such as a laser beam printer, a digital copier and the like, and more particularly relates to an overfilled type optical scanning apparatus in which the width of a luminous flux incident upon a rotational polygonal mirror in a direction corresponding to the primary scanning direction is wider than the width of the reflecting surface of the rotational polygonal mirror in the rotational direction.

In an optical scanning apparatus, a beam of light is deflected by a rotational polygonal mirror to the primary scanning direction, and a surface to be scanned is scanned by the deflected beam of light. As the above type optical scanning apparatus, an underfilled type optical scanning apparatus is commonly used, in which the width of the reflecting surface of the rotational polygonal mirror in the rotational direction, this width will be referred to as a surface width in this specification hereinafter, is wider than the width of a beam of light incident upon the rotational polygonal mirror in a direction corresponding to the primary scanning direction. In this type optical scanning apparatus, all the beam of light incident upon the rotational polygonal mirror is reflected in the substantially same direction. Therefore, power of the beam of light can be effectively utilized.

In this connection, there is a perennial demand for an increase in the image recording speed and an enhancement of the resolution of image formation in the image forming apparatus such as a laser beam printer and a digital copier in which an optical beam such as a laser beam is used. In order to meet the demand for increasing the image recording speed by the aforementioned underfilled type optical system, it can be considered to increase the rotational speed of the rotational polygonal mirror so that the scanning speed of a beam of light can be increased.

However, when a ball bearing is used for the drive shaft of a drive motor to rotate the rotational polygonal mirror, the maximum rotational speed is approximately 15,000 rpm at present. Even when an air bearing of high performance is used, the maximum rotational speed is approximately 40,000 rpm. Accordingly, there is a limit to the increase in the image recording speed when the rotational speed of the rotational polygonal mirror is increased.

Also, it can be considered to increase the image recording speed and enhance the resolution of image formation when the number of reflecting surfaces of the rotational polygonal mirror is increased so that the frequency of scanning operation in one revolution of the rotational polygonal mirror can be increased. However, when the number of reflecting surfaces is increased and the surface width of each reflecting surface is made to be wider than the width of a beam of light, it is necessary to increase the diameter of the rotational polygonal mirror. Accordingly, the size and weight of the polygonal mirror are increased, and it becomes difficult to drive the rotational polygonal mirror by a common drive motor.

In order to prevent an increase in the diameter of the rotational polygonal mirror and also in order to increase the number of reflecting surfaces, there is disclosed an overfilled type optical scanning apparatus (shown in Japanese Unexamined Patent Publication No. Sho. 50-93719) in which the surface width of each reflecting surface is made to be smaller than the width of a beam of light so that the diameter of the rotational polygonal mirror can be reduced and the number of reflecting surfaces can be increased. An example of this type optical scanning apparatus 80 is shown in FIG. 1. As shown in the drawing, the optical scanning apparatus 80 includes: a light source 81 for generating a beam of light; a modulator 82 for modulating a beam of light in accordance with an image signal; a mirror 84; a plane-concave cylindrical lens 86, the light beam emergent side of which is formed into a curved surface so that a beam of light can be made to diverge in a direction corresponding to the primary scanning direction; a rotational polygonal mirror 90, on the side of which about 20 reflecting surfaces are formed; an image formation lens 88 for deflecting a beam of light sent from the plane-concave cylindrical lens 86 and also for forming a linear image on a plurality of reflecting surfaces of the rotational polygonal mirror 90 in a direction corresponding to the primary scanning direction so that a beam of light reflected on the rotational polygonal mirror 90 can be converged at a position close to a photoreceptor 94; and a cylindrical lens 92 for conducting a correction of tilt (correction of a tilted surface) of the deflected beam, which has been deflected by the rotational polygonal mirror 90, in the subsidiary scanning direction. For example, setting is made as follows. Wave length $\lambda$ of a beam of light emitted from the light source 81 is 632.8 nm. The maximum deflection angle a of the deflected beam with respect to the central optical axis U of the optical system for conducting a surface tilt correction by the cylindrical lens 92 is 12° to 18°. Scanning width X is 280 mm.

In general, the diameter of a beam of light irradiated on the photoreceptor 94 fluctuates by the curvature of field. For example, when the central value of fluctuation of the diameter of a beam of light irradiated on the photoreceptor 94 is 150 $\mu$m, as shown in FIG. 2, in the case where a quantity of the curvature of field (the deviation of a beam waist position in the optical axis direction) is not more than 15 mm, the maximum beam diameter is approximately 170 $\mu$m, and a range of fluctuation of the beam diameter (a difference between the beam diameters at points A and B in FIG. 2) is approximately 20 $\mu$m. Accordingly, no problems are caused by the curvature of field.

Beam width D, which is in a direction corresponding to the primary scanning direction, of beam M deflected by the rotational polygonal mirror is constant in the underfilled type optical scanning apparatus. However, in the overfilled type optical scanning apparatus, it fluctuates in a predetermined range. For example, the beam width fluctuates as follows. As shown in FIG. 3, when beam M, the center of which coincides with the optical axis X, is irradiated on a plurality of surfaces of the rotational polygonal mirror 90 rotating in the direction of arrow K, beam width D is gradually increased from beam width $D_1$ to $D_3$ through $D_2$. In this case, beam width $D_1$ is defined as a beam width at the start position of scanning (referred to as SOS in the specification hereinafter) in which beam M is deflected in the direction of axis $Y_S$ by the rotational polygonal mirror, beam width $D_2$ is defined as a beam width at the center position of scanning (referred to as COS in the specification hereinafter) in which beam M is deflected in the direction of axis $Y_C$ by the rotational polygonal mirror, and beam width $D_3$ is defined as a beam width at the end position of scanning (referred to as EOS in the specification hereinafter) in which beam M is deflected in the direction of axis $Y_E$ by the rotational polygonal mirror. Accordingly, F-number corresponding to a value obtained when the focal distance f of the optical system is divided by the above beam width D fluctuates from SOS to EOS in such a manner that the value can be gradually decreased.

In this connection, beam diameter K of the beam irradiated on a plane to be scanned (the photoreceptor 94 in the case shown in FIG. 1) is substantially proportional to the product of the wave length λ of the beam emitted by the light source and F-number. Accordingly, beam diameter K and F-number are proportional to each other. Consequently, when F-number fluctuates as described above, beam diameter K also fluctuates according to the scanning position on the plane to be scanned.

For example, in the optical scanning apparatus shown in FIG. 1, scanning width X on the photoreceptor 94 is 280 mm, the maximum deflection angle α is 18°, angle β formed between optical axis V of the image formation lens 88 and optical axis U is 90°, wave length λ of the beam emitted by the light source is 632.8 nm, and a ratio of the width in the rotational direction of the reflecting surface of the rotational polygonal mirror, to the size in a direction corresponding to the primary scanning direction of the luminous flux incident upon the reflecting surface is 2. In the above case, a ratio of F-number of SOS to F-number of EOS (a difference between F-number of the right and F-number of the left) is 0.73 at maximum. In this case, when the central value of fluctuation of diameter K of the beam irradiated on the photoreceptor 94 is 150 μm, diameter K of the beam irradiated on the photoreceptor 94 is 205 μm at the maximum. When the substantial increment 20 μm caused by the curvature of field and the substantial increment 55 μm caused by the difference between F-number of the right and F-number of the left are added, the total increment becomes approximately 75 μm. In other words, the maximum fluctuation of the irradiation beam diameter is approximately 80 μm. For this reason, it is difficult to practically use the above optical scanning apparatus.

Also, in general, between the light source and the rotational polygonal mirror, there are provided a collimator lens for making a laser beam, which is a divergent beam emitted by a light source such as a semiconductor laser, into a parallel beam, and a cylindrical lens for converging the parallel beam in a direction corresponding to the subsidiary scanning direction. In the optical system of this arrangement, adjustment of the width of the laser beam in a direction corresponding to the primary scanning direction is conducted by adjusting an interval between the light source and the collimator lens, and the light source is arranged at the focus of the collimator lens. The width of the laser beam in the direction corresponding to the subsidiary scanning direction is adjusted when an interval between the cylindrical lens and the rotational polygonal mirror is adjusted, so that the rotational polygonal mirror is disposed at a position of the focus of the cylindrical lens or a position close to it. In other words, according to this arrangement, the width of the laser beam in the direction corresponding to the primary scanning direction and the width of the laser beam in the direction corresponding to the subsidiary scanning direction are independently adjusted. This independent adjustment is an advantage.

In the case of an underfilled type optical scanning apparatus, width D of the luminous flux, which has been deflected by the rotational polygonal mirror, in the direction corresponding to the primary scanning direction is constant irrespective of the scanning angle. On the other hand, in the case of an overfilled type optical scanning apparatus, as shown by $D_1$ to $D_3$ in FIG. 3, the width is changed in an interval between the scanning start position (SOS) and the scanning end position (EOS). Since the Gaussian laser beam is used, the beam diameter and the quantity of light on the photoreceptor are changed by a region of the laser beam to be used and the width of the region. That is, in the overfilled type optical scanning apparatus, the beam diameter and the quantity of light are changed according to the scanning position on the photoreceptor.

As disclosed in Japanese Unexamined Patent Publication No. Sho. 50-93719, the scanning width (X) on the photoreceptor is 280 mm, half of the angle formed between both outermost edge portions of the deflected luminous flux (this angle is referred to as a scanning half angle "a" hereinafter) is ±18°, and an angle formed between a projection line obtained when the optical axis of the image formation lens 10 is projected on a plane including both outermost edge portions of the deflected luminous flux and a straight line for equally dividing an angle formed between both outermost edge portions of the deflected luminous flux into 2 (this angle is referred to as an incident angle β hereinafter) is 90°, the wave length λ of the beam emitted by the light source is 632.8 nm, and a ratio of the surface width of the reflecting surface of the rotational polygonal mirror in the rotational direction to the width of the incident luminous flux in a direction corresponding to the primary scanning direction is 2. In the above case, when consideration is given to the Gaussian beam which is used for the laser beam in this case, it is estimated that the uniformity of a quantity of light distributed on the photoreceptor is approximately 65%, which is not suitable for practical use.

In the case where the optical system of the common arrangement described before is applied to an overfilled type optical scanning apparatus, the luminous flux incident upon the collimator lens must be a luminous flux, the width of which is wide in a direction corresponding to the primary scanning direction. Accordingly, a distance from the light source to the collimator lens must be long. As a result, length of the optical path from the light source to the rotational polygonal mirror is extended. Further, a collimator lens of a large aperture necessary for obtaining a wide luminous flux is very expensive.

SUMMARY OF THE INVENTION

The present invention has been accomplished in view of the above problems. It is an object of the present invention to provide an optical scanning apparatus in which an increase in the diameter of the rotational polygonal mirror can be avoided and a range of fluctuation of the diameter of the beam irradiated on a plane to be scanned can be accommodated in an allowable range.

Another object of the present invention is to provide an overfilled type optical scanning apparatus in which an increase in the diameter of the rotational polygonal mirror can be avoided and a quantity of light can be uniformly distributed on the surface of the photoreceptor.

Still another object of the present invention is to provide an overfilled type optical scanning apparatus in which length of the optical path from the light source to the rotational polygonal mirror can be reduced.

In order to accomplish the above objects, the present invention according to a first aspect is to provide an optical scanning apparatus comprising: a light source; a rotational polygonal mirror having a plurality of reflecting surfaces parallel with the rotational axis, the incident luminous flux being deflected on the reflecting surfaces in a predetermined direction at a substantially constant angular velocity; a first optical system for forming a luminous flux sent from the light source into a linear image which is long in a direction corresponding to the primary scanning direction in such a manner that the linear image strides a plurality of reflecting surfaces of the rotational polygonal mirror; and a second optical system for converging the deflected luminous flux upon a surface to be scanned so that scanning can be conducted by a spot of light at substantially constant speed, wherein the first optical system, the rotational polygonal mirror and the second optical system are composed to satisfy the following expressions.

$$(\cos((\beta+\alpha)\div 2))\div(\cos((\beta-\alpha)\div 2)) \geq 0.75, \text{ and}$$

$$0° < \beta < 90°$$

where $\alpha$ is the maximum deflection angle of the deflection luminous flux with respect to the central optical axis of the second optical system, and $\beta$ is an angle formed between the optical axis of the first optical system projected on a plane substantially perpendicular to each reflecting surface of the rotational polygonal mirror, and the central optical axis of the second optical system.

The present invention according to a second aspect is to provide an optical scanning apparatus comprising: a light source; a rotational polygonal mirror having a plurality of reflecting surfaces parallel with the rotational axis, the incident luminous flux being deflected on the reflecting surfaces in a predetermined direction at a substantially constant angular velocity; a first optical system for forming a luminous flux sent from the light source into a linear image which is long in a direction corresponding to the primary scanning direction in such a manner that the linear image strides a plurality of reflecting surfaces of the rotational polygonal mirror; and a second optical system for converging the deflected luminous flux upon a surface to be scanned so that scanning can be conducted by a spot of light at substantially constant speed, wherein the first optical system, the rotational polygonal mirror and the second optical system are composed to satisfy the following expressions:

$$\beta = 0° \text{ and } \cos(\alpha \div 2) \geq 0.8$$

where $\alpha$ is the maximum deflection angle of the deflection luminous flux with respect to the central optical axis of the second optical system, and $\beta$ is an angle formed between the optical axis of the first optical system projected on a plane substantially perpendicular to each reflecting surface of the rotational polygonal mirror, and the central optical axis of the second optical system.

The present invention according to a third aspect is to provide an optical scanning apparatus comprising: a light source; a rotational polygonal mirror having a plurality of reflecting surfaces parallel with the rotational axis, the incident luminous flux being deflected on the reflecting surfaces in the primary scanning direction at a substantially constant angular velocity; a first optical system for forming a luminous flux sent from the light source into a linear image which is long in a direction corresponding to the primary scanning direction in such a manner that the linear image strides a plurality of reflecting surfaces of the rotational polygonal mirror; and a second optical system for converging the deflected luminous flux upon a surface to be scanned so that scanning can be conducted by a spot of light at substantially constant speed, wherein a ratio of the size of the reflecting surface in the rotational direction to the size of the luminous flux in a direction corresponding to the primary scanning direction, the luminous flux being emitted by the first optical system, is not less than 1.5 and not more than 4.0, an angle formed by both outermost edge portions of the deflected luminous flux is not less than 30° and not more than 60°, and an angle formed between a projection line obtained when the optical axis of the first optical system is projected on a plane including both outermost edge portions of the deflected luminous flux and a straight line for equally dividing an angle formed between both outermost edge portions of the deflected luminous flux into 2 is smaller than 90°.

DETAILED DESCRIPTION OF THE INVENTION

Figure 1:
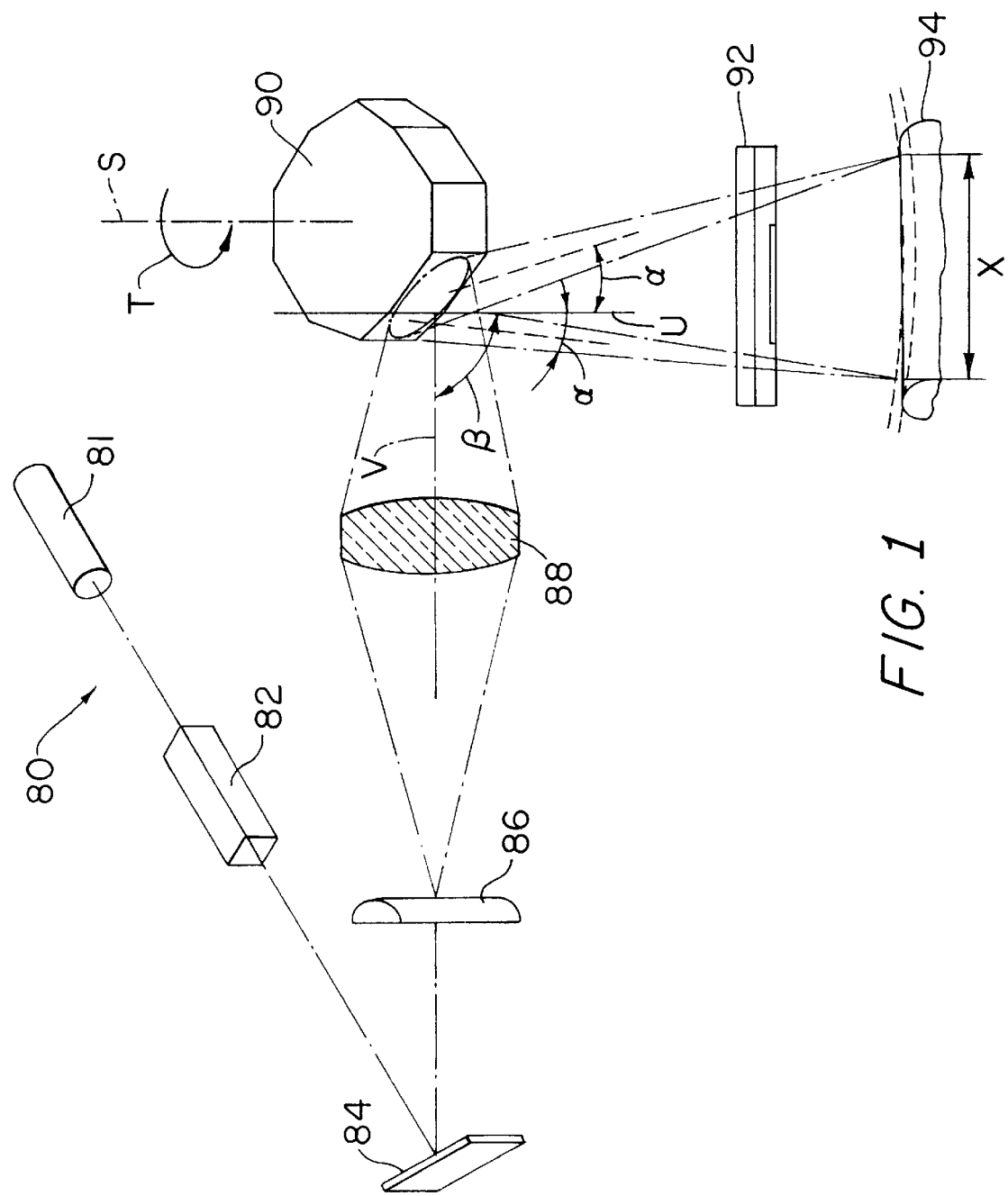
FIG. 1 is an arrangement view showing an outline of the conventional optical scanning apparatus.
Figure 2:
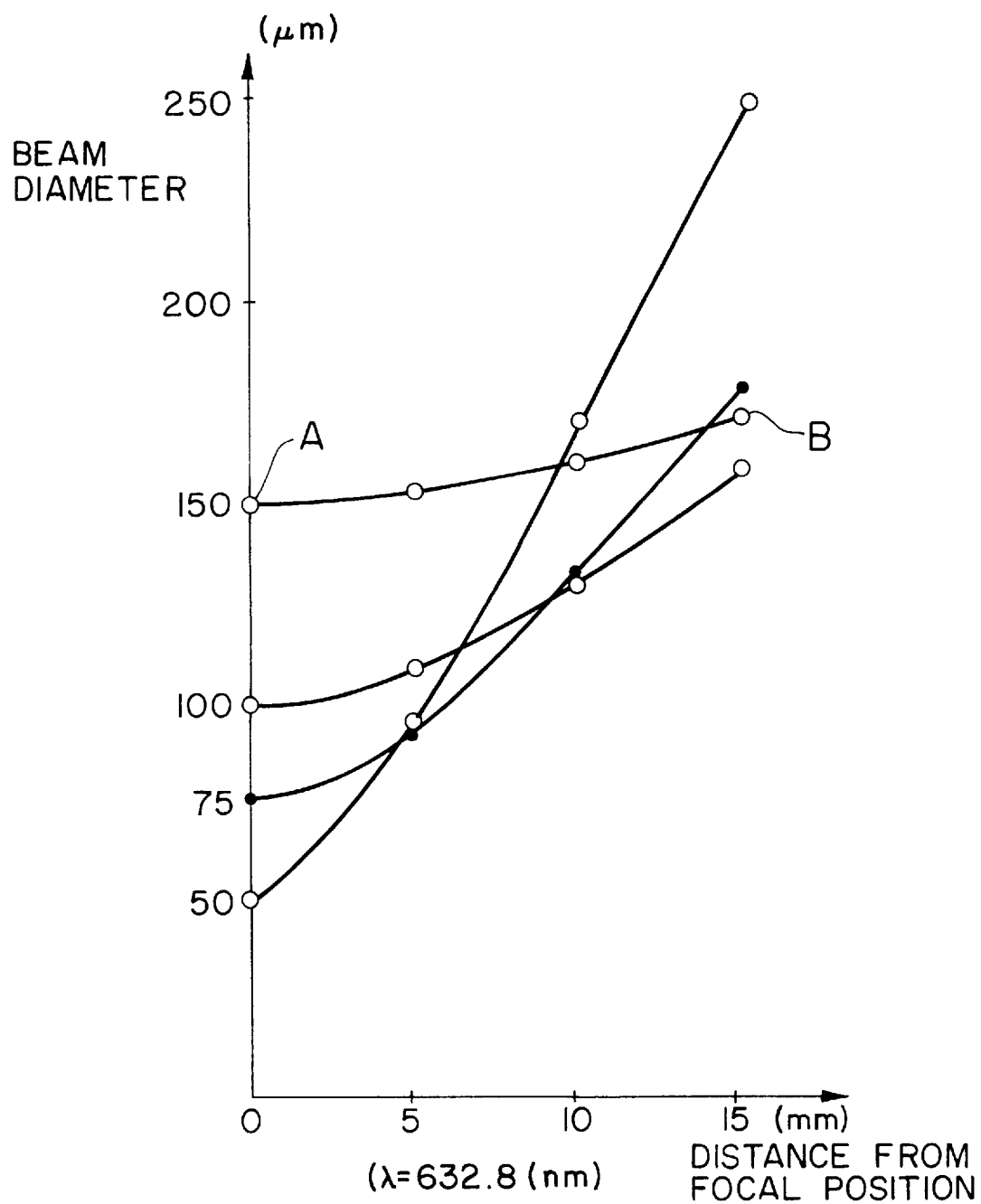
FIG. 2 is a diagram showing a relation between the distance from the focal position and the irradiation beam diameter in the case where the wave length of a luminous flux is 632.8 nm.
Figure 3:
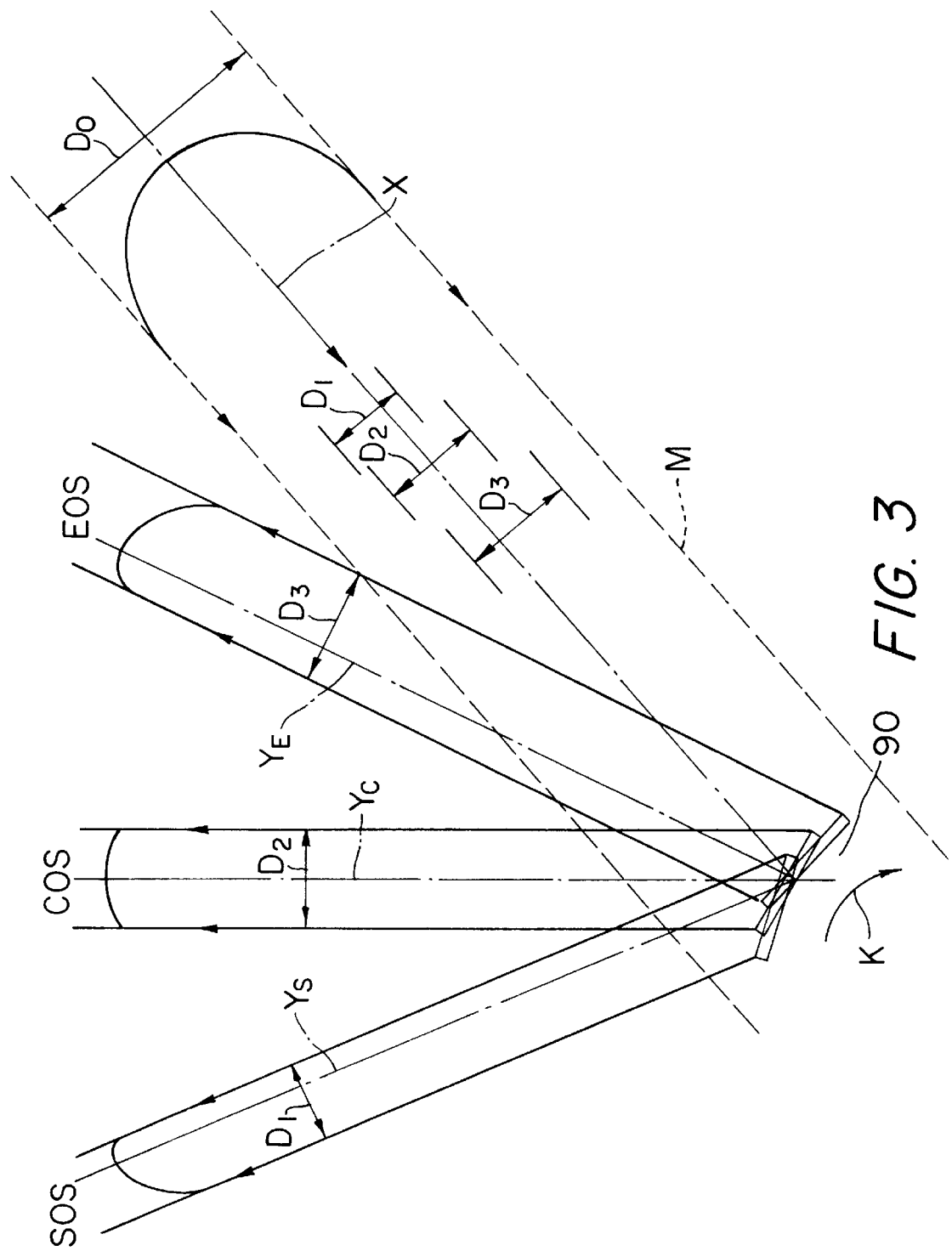
FIG. 3 is a schematic illustration showing a beam width of the deflected luminous flux sent from the polygonal mirror.

Preferred embodiments of the present invention will be described with reference to the drawings.

According to the first aspect of the present invention set forth in the "Summary of the Invention" section, in the first optical system, a luminous flux emitted by the light source is formed into a linear image which is long in a direction corresponding to the primary scanning direction in such a manner that the luminous flux strides over a plurality of reflecting surfaces of the rotational polygonal mirror, and the luminous flux incident upon a plurality of reflecting surfaces parallel with the rotational axis of the rotational polygonal mirror is deflected in a predetermined direction at a substantially constant angular velocity. Further, in the second optical system, the deflected luminous flux is converged on a plane to be scanned so that scanning can be conducted by a spot of light at a substantially constant speed. At this time, the deflection luminous flux is deflected to the front and the rear while the central optical axis of the second optical system is the center, by the substantially same maximum deflection angle $\alpha$ in the scanning direction.

The first optical system, the rotational polygonal mirror and the second optical system are composed to satisfy the following equation when $\beta$ is in the range of $0°<\beta<90°$.

$$(\cos((\beta+\alpha) \div 2)) \div (\cos((\beta-\alpha) \div 2)) > 0.75 \quad (1)$$

where $\alpha$ is the maximum deflection angle of the deflection luminous flux with respect to the central optical axis of the second optical system, and $\beta$ is an angle formed between the optical axis of the first optical system projected on a plane substantially perpendicular to each reflecting surface of the rotational polygonal mirror, and the central optical axis of the second optical system.

In this connection, beam width $D_1$ in the primary scanning direction of the deflection luminous flux deflected by the rotational polygonal mirror in the case of SOS is expressed by the following equation (2), and beam width $D_3$ in the primary scanning direction of the deflection luminous flux deflected by the rotational polygonal mirror in the case of EOS is expressed by the following equation (3), wherein the surface width of the rotational polygonal mirror is Fa.

$$D_1 = Fa \times \cos((\beta+\alpha) \div 2) \quad (2)$$

$$D_3 = Fa \times \cos((\beta-\alpha) \div 2) \quad (3)$$

Consequently, the left side of the equation (1) corresponds to "width $D_1 \div$ width $D_3$". Since the focal distance f of the optical system is constant, the left side of the equation (1) is equal to "F-number $F_3$ in the case of EOS÷F-number $F_1$ in the case of SOS".

In the case where a value obtained by the above expression "F-number $F_3$ in the case of EOS÷F-number $F_1$ in the case of SOS" is equal to 0.75 which is a boundary value of the equation (1), when F-number $F_2$ in the case of COS is 1, F-number $F_3$ in the case of EOS is approximately 0.875, and F-number $F_1$ in the case of SOS is approximately 1.125. Accordingly, F-number changes in the range of ±0.125 with respect to F-number $F_2$ in the case of COS.

Since beam diameter K, which is a diameter of the beam spot generated when a predetermined luminous flux is irradiated on a plane to be scanned, is proportional to F-number of the luminous flux concerned, when beam diameter $K_2$ of the luminous flux irradiated on the plane to be scanned is 75 μm, beam diameter $K_1$ (irradiation beam diameter) of the irradiation luminous flux in the case of SOS and beam diameter $K_3$ (irradiation beam diameter) of the irradiation luminous flux in the case of EOS are found in accordance with the above ratio of F-number, and further when consideration is given to errors, irradiation beam diameter K is accommodated in the range from 60 to 90 μm.

Figure 5:
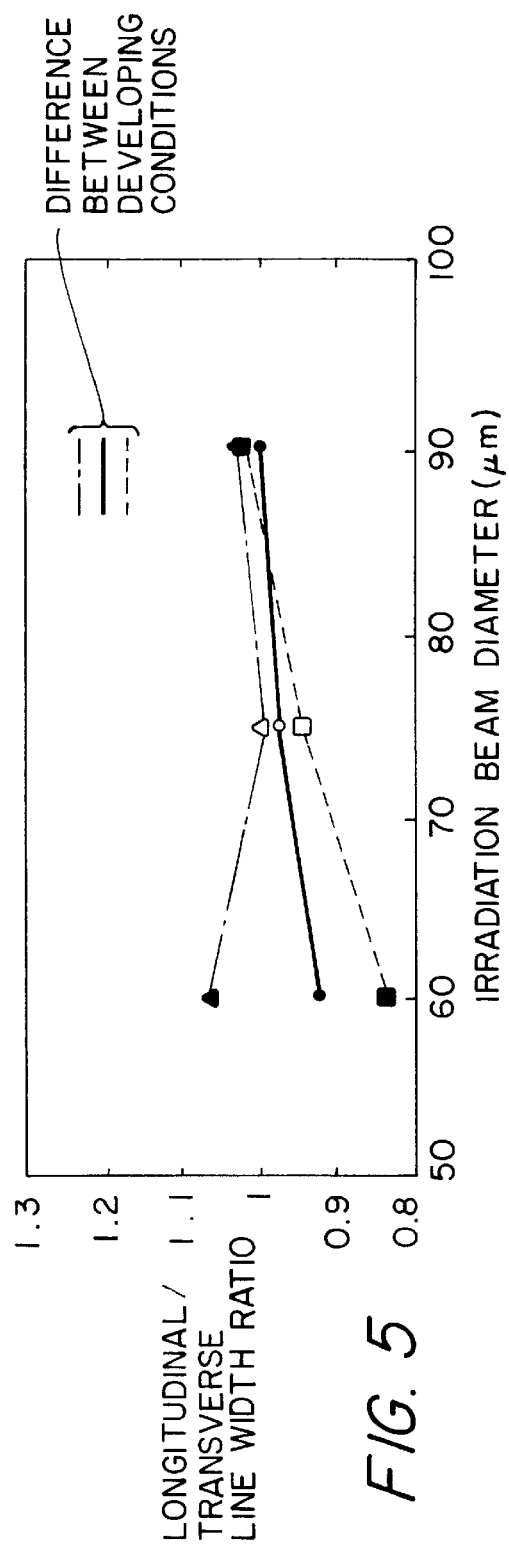
FIG. 5 is a diagram showing a relation between the irradiation beam diameter and the line width ratio of the width of a longitudinal line to the width of a transverse line.
Figure 6:
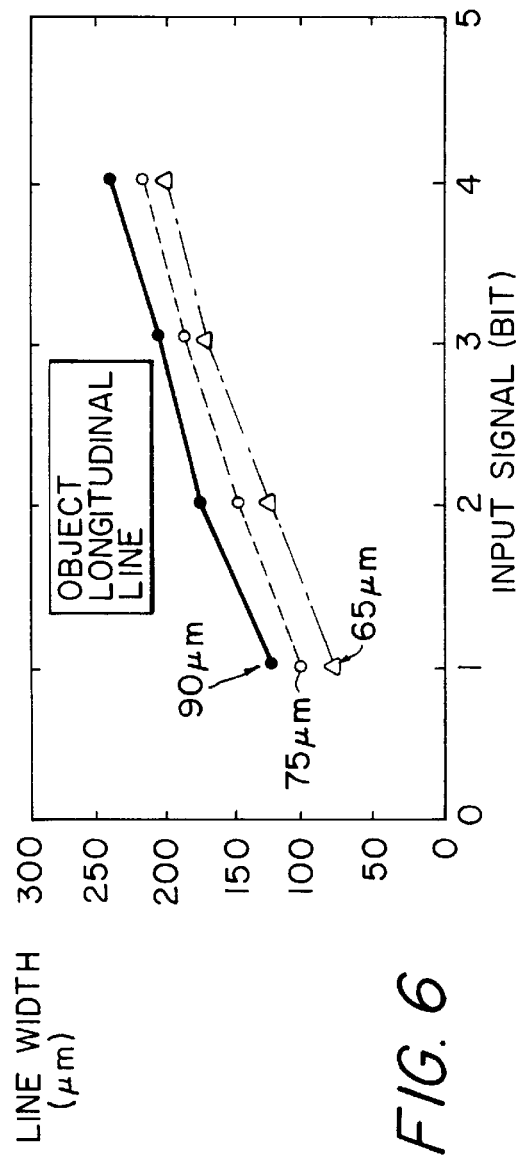
FIG. 6 is a diagram showing a relation between the number of bits of an input signal on a longitudinal line and the line width.

For example, when the plane to be scanned is a photoreceptive surface and a latent image formed when the photoreceptive surface is irradiated with a luminous flux is developed, a ratio (aspect ratio) of the width of a narrow line extending longitudinally to the width of a narrow line extending transversely on a visual image obtained by development is changed in accordance with the developing condition as shown in FIG. 5. Degree of the change is increased when irradiation beam diameter K is decreased. Depending upon the developing condition, as can be seen in FIG. 5, when irradiation beam diameter K is smaller than 60 μm, the aspect ratio of narrow lines is out of the range of 0.9 to 1.1 so that the difference between the widths of the longitudinal and transverse narrow lines can be easily recognized. For example, when the resolution is 600 dpi (the dot interval is approximately 42.5 μm) and the longitudinal lines are recorded by the operation of 2-on and 2-off (2 dots are continuously recorded and the next 2 dots are not recorded in the primary scanning direction, and this operation is repeated), it is necessary that the width of the longitudinal lines is smaller than 170 μm (42.5 μm×4). This is because, if the width is 170 μm or more, a space between the adjacent longitudinal lines is filled with the lines so that the longitudinal lines can not be recognized. However, when irradiation beam diameter K is out of the range of 60 to 90 μm, that is, when irradiation beam diameter K is larger than 90 μm, which is a case described before as an example, as shown in FIG. 6, when 2 dots are continuously recorded, the width of longitudinal lines exceeds 170 μm, and a space between the adjacent longitudinal lines are filled with the lines.

As described above, when the irradiation beam diameter in the case of COS is 75 μm, it is necessary that a fluctuation of the irradiation beam diameter in the primary scanning direction is restricted within the range of 60 to 90 μm. It is possible to accomplish the above condition when the first optical system, rotational polygonal mirror and second optical system are composed in such a manner that the equation (1) is satisfied. In the example described above, the irradiation beam diameter in the case of COS is 75 μm. Except for that, as long as the equation (1) is satisfied, fluctuation of the irradiation beam diameter can be restricted within an allowable range. As described above, it is not necessary to make the surface width of the reflecting surface of the polygonal mirror to be larger than the beam width of an incident luminous flux. Therefore, it is possible to prevent the diameter of the polygonal mirror from increasing.

Incidentally, it is preferable the the first optical system, rotational polygonal mirror and second optical system are arranged in such a manner that the maximum deflection angle α is not less than 15° and the angle β is not less than 30°.

Figure 9:
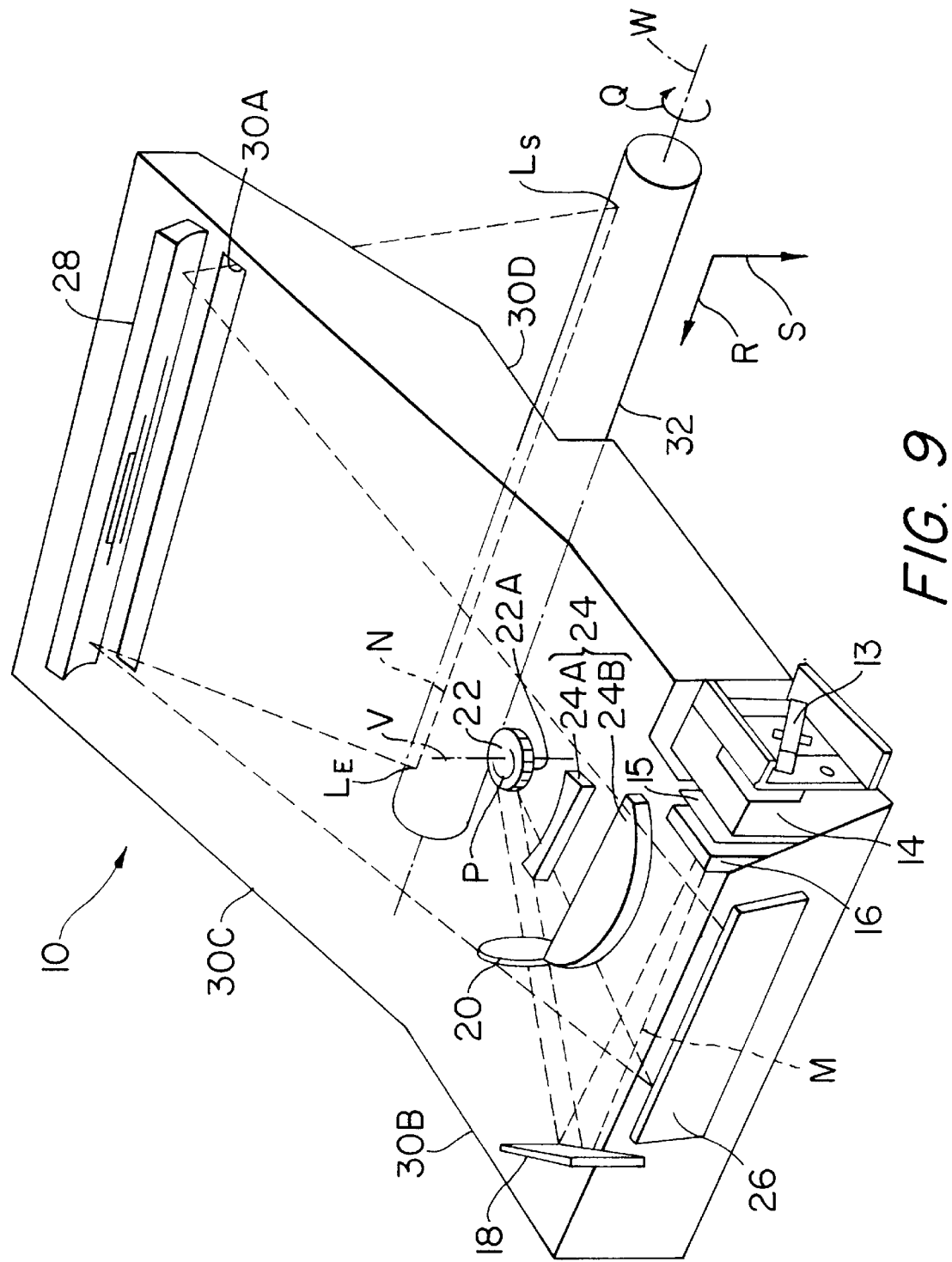
FIG. 9 is an arrangement view showing an outline of the optical scanning apparatus of the embodiment of the present invention.

When the maximum deflection angle α is smaller than 15°, for example, as shown in FIG. 9, when scanning width X is 297 mm, the focal distance f becomes not less than 550 mm, so that the length of the optical path from the rotational polygonal mirror to the plane to be scanned becomes not less than 600 mm. Therefore, even when it is attempted to downsize the optical scanning apparatus by arranging mirrors 18, 26, 28 in the manner shown in FIG. 9, the optical scanning apparatus concerned becomes large so that it deviates from the regular sheet size A4. As a result, dimensions of the laser beam printer or a digital copier, to which the optical scanning apparatus of the present invention is assembled, are increased. On the other hand, when the maximum deflection angle α is not less than 15°, for example, when mirrors 18, 26, 28 are arranged as shown in FIG. 9, it is possible to reduce the dimensions of the optical scanning apparatus concerned to be smaller at least than sheet size A4.

Figure 4:
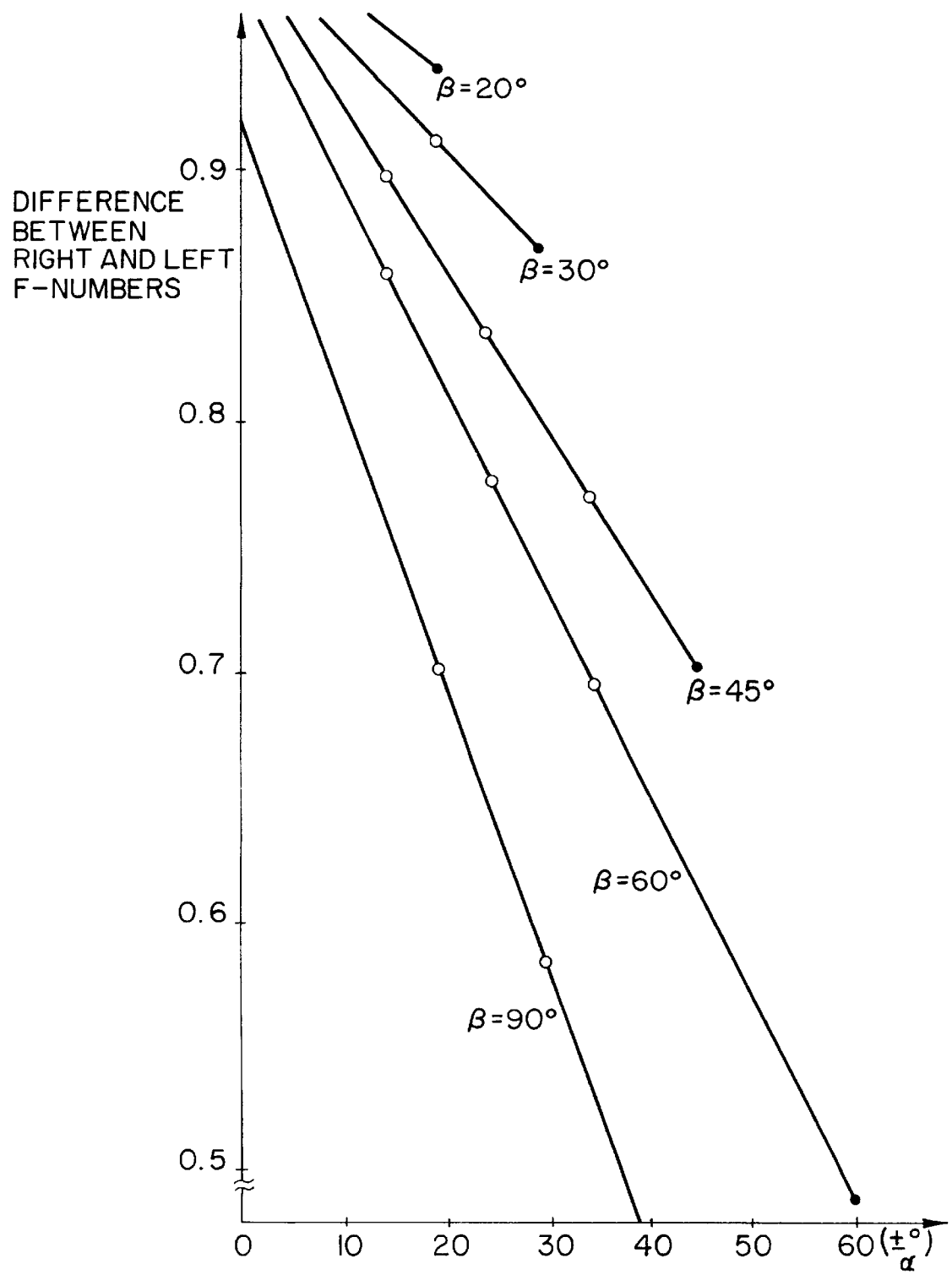
FIG. 4 is a diagram showing a relation between the maximum deflection angle $\alpha$ and the difference between F-number of the right and F-number of the left in the case of start and end of scanning.

A ratio of F-number in the case of SOS to F-number in the case of EOS (this ratio is referred to as a difference between F-number of the right and F-number of the left) changes in accordance with changes in the maximum deflection angle a and the angle β as shown in FIG. 4. As can be seen in FIG. 4, even if the maximum deflection angle α is not less than 15°, when the angle β is smaller than 30°, since the difference between F-number of the right and F-number of the left is originally at a level of about 0.9 which can not be visually recognized, even when the present invention is not applied, image quality can be maintained at a somewhat satisfactory level. On the other hand, when the angle β is not less than 30°, the difference between F-number of the right and F-number of the left can not reach 0.9, so that image quality is remarkably deteriorated. For this reason, when the present invention is applied to a case in which the first optical system, rotational polygonal mirror and second optical system are composed in such a manner that the maximum deflection angle α is not less than 15° and the angle β is not less than 30°, image quality can be clearly enhanced.

Figure 8:
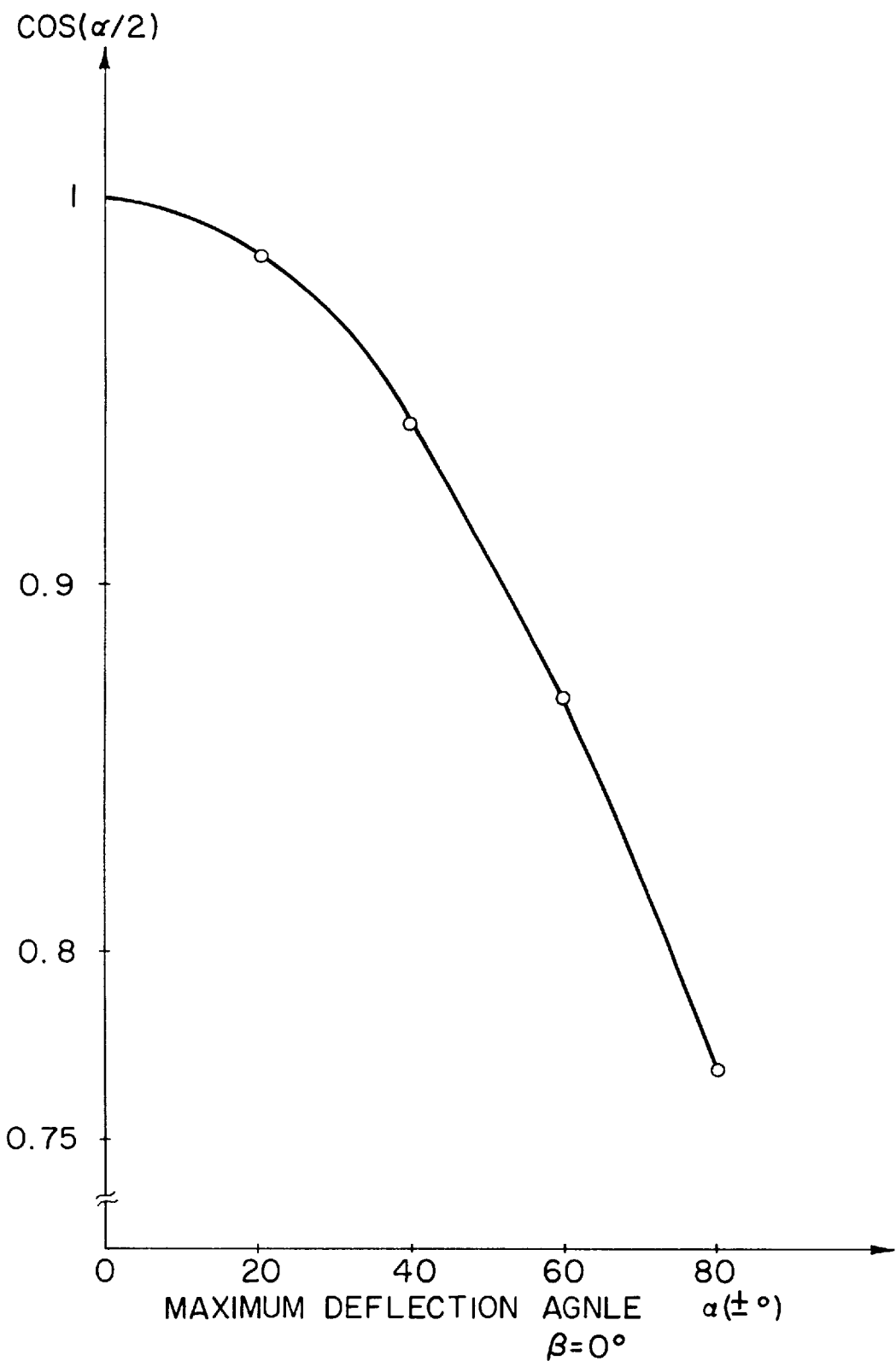
FIG. 8 is a diagram showing a relation between the angle $\alpha$ and $\cos(\alpha \div 2)$.

In this connection, the first optical system, rotational polygonal mirror and second rotational system may be arranged so that the optical axis of the first optical system coincides with the central axis of the second optical system when a beam of light is projected in a direction parallel with the rotational axis of the polygonal mirror. In the above case, the angle β becomes 0°. In this case, the difference between F-number of the right and F-number of the left is reduced to 0, and a difference between F-number $F_1$ (or $F_3$) in the case of SOS (or EOS) and F-number $F_2$ in the case of COS, that is, a value of $\cos(\alpha \div 2)$ becomes not less than 0.76 as shown in FIG. 8. Accordingly, this arrangement in which the angle β is 0 is preferable.

However, when the value of $\cos(\alpha \div 2)$ is lower than 0.8 as shown in FIG. 8, the angle α becomes larger than 70°, that is, the angle α exceeds the limit of design of the lens to be used in the second optical system, that is, the angle a exceeds the limit of design of the fθ lens. Accordingly, it is impossible to satisfy the allowance of curvature of field and the performance of the positional correction in the scanning direction.

Consequently, when the first optical system, rotational polygonal mirror and second optical system are composed so as to satisfy the condition of β=0° and $\cos(\alpha \div 2) \geq 0.8$, it is possible to compose the optical scanning apparatus under the condition that the lens used in the optical scanning system, for example, the fθ lens does not exceed the limit of design. Further, when β=0°, it is possible to downsize the optical scanning apparatus.

Further, when the light source is disposed inside the focal position of the collimator lens, the luminous flux emergent from the collimator lens becomes a beam of divergent light. Width of the beam of divergent light in a direction corresponding to the primary scanning direction is adjusted to a predetermined width by the primary scanning direction adjusting lens. In other words, the width of the luminous flux in a direction corresponding to the primary scanning direction is adjusted when a distance from the light source to the collimator lens and also a distance from the collimator lens to the primary scanning direction adjusting lens are respectively adjusted. On the other hand, the width of the divergent rays of light in a direction corresponding to the subsidiary scanning direction is adjusted when a distance from the subsidiary scanning direction adjusting lens to the rotational polygonal mirror is adjusted.

In this case, the above primary scanning direction adjusting lens is disposed between the subsidiary scanning direction adjusting lens and the rotational polygonal mirror. That is, an interval necessary for adjusting the width in a direction corresponding to the primary scanning direction and an interval necessary for adjusting the width in a direction corresponding to the subsidiary scanning direction overlap with each other in a region between the subsidiary scanning adjusting lens and the primary scanning direction adjusting lens. The light source is disposed inside the focal distance of the collimator lens, so that a distance from the light source to the collimator lens is reduced. Therefore, the length of the optical path from the light source to the rotational polygonal mirror can be reduced which is necessary for obtaining a luminous flux, the incident luminous flux width of which is wider than the surface width of the reflecting surface of the rotational polygonal mirror.

As an embodiment of the present invention, an optical scanning apparatus will be explained in more detail which is used for a laser beam printer, a digital copier and the like.

As shown in FIG. 9, the optical scanning apparatus 10 of this embodiment is provided with a casing 30, the shape of which is predetermined. This casing 30 is composed of a flat lower portion 30B and an upper portion 30C diagonally extending upward from one end of the lower portion 30B. On a lower surface of the upper portion 30C, there is formed a substantially rectangular hole 30A which is long in the width direction (the direction of arrow R). A beam of light emitted to the outside of the casing 30 passes through this hole 30A. A lower surface 30D close to the joint portion of the lower portion 30B and the upper portion 30C is cut away in the width direction, so that a sufficiently large space is formed for accommodating a photoreceptor drum 32 described later.

Figure 10A:
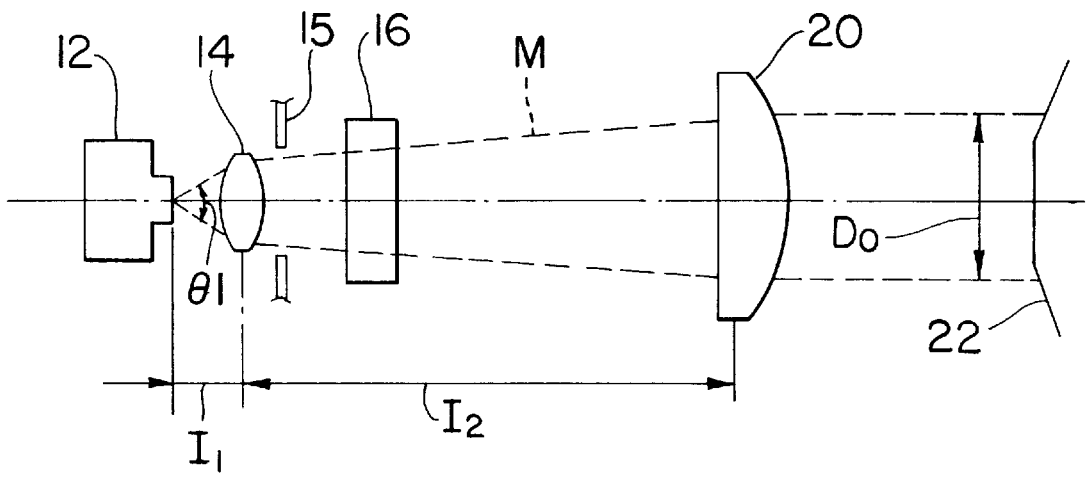
FIG. 10(A) is an upper surface view showing an arrangement of the light source, first optical system and rotational polygonal mirror.
Figure 10B:
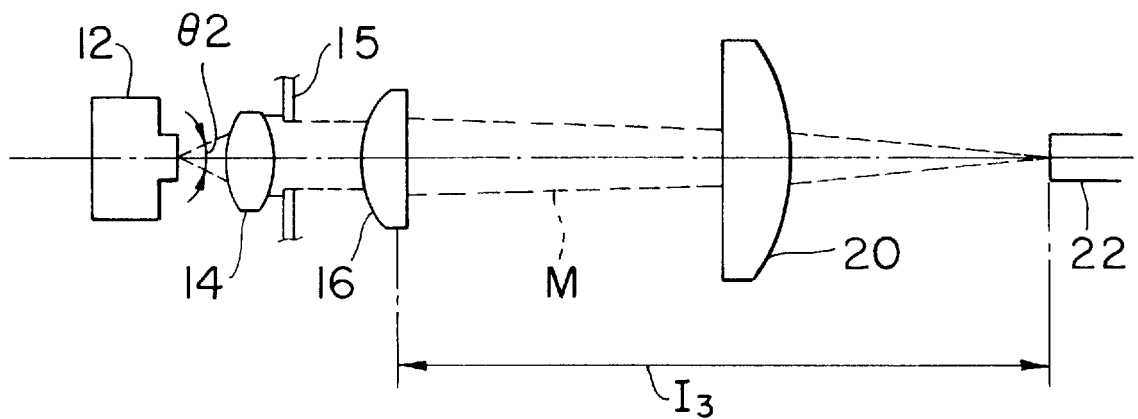
FIG. 10(B) is a side view of FIG. 10(A).

On one side of the casing 30 in the width direction, there is provided a laser diode assembly 13 having a semiconductor laser 12 (FIGS. 10(A), 10(B)) which is used as a light source. On the emergent side of a beam of light emitted by the semiconductor laser 12, there is provided a collimator lens 14, the focal distance f1 of which is 12.5 mm, by which a beam of light emitted by the semiconductor laser 12 is formed into a parallel beam. In this case, a distance from the semiconductor laser 12 to the collimator lens 14 is shorter than the focal distance f1 by 0.8 mm. In other words, the semiconductor laser 12 is disposed inside the focal distance f1 of the collimator lens 14. On the emergent side of a beam of light of the collimator lens 14, there is provided a slit 15 used for forming the shape of a beam of light. At a position adjacent to the slit 15, there is provided a cylindrical lens 16 having a lens power only in the subsidiary scanning direction indicated by arrow S, wherein the cylindrical lens 16 converges a beam of light upon the deflection surface of a rotational polygonal mirror 22 in the subsidiary direction. In this connection, end portions of the locus of the beam of light emitted by the semiconductor laser 12 are illustrated by broken lines M in FIG. 9.

On the other side of the casing 30 in the width direction, there is provided a flat mirror 18, on which the beam of light transmitted through the cylindrical lens 16 is reflected toward the inside of the casing 30. At the substantial center of the casing 30 which corresponds to a downstream side of the reflecting direction, there is provided a pentadecagonal rotational polygonal mirror 22. On the circumferential surface of the rotational polygonal mirror 22, there are provided a plurality of deflecting faces 22A, the surface width of which is predetermined. The rotational polygonal mirror 22 is rotated at a predetermined angular velocity around a perpendicular rotational shaft V by a drive force generated by a drive mechanism not shown in the drawing. Between the flat mirror 18 and the rotational polygonal mirror 22, there is provided a convex lens 20 by which a beam of light reflected on the flat mirror 18 is made into a substantially parallel luminous flux in the primary scanning direction.

On one side of the casing 30 in the longitudinal direction, there is provided another flat mirror 26. Between this flat mirror 26 and the rotational polygonal mirror 22, there is provided an fθ lens 24, the focal distance f2 of which is 286.5 mm, composed of two lenses 24A and 24B. This fθ lens 24 converges a beam of light deflected on the rotational polygonal mirror 22 at a position close to the surface of the photoreceptor drum 32 so that a substantially circular spot of light irradiated on the surface of the photoreceptor drum 32 can be moved on the surface of the photoreceptor drum 32 at a substantially constant speed in the scanning direction (the direction of arrow R) in accordance with the rotation of the rotational polygonal mirror 22 at a constant angular velocity.

On the other side of the casing 30 in the longitudinal direction, there is provided a cylindrical mirror 28 for correcting a tilt of the beam of light reflected on the flat mirror 26 in the subsidiary direction. In this connection, the collimator lens 14, cylindrical lens 16 and convex lens 20 described above correspond to the first optical system of the present invention, and the fθ lens 24 corresponds to the second optical system of the present invention. The collimator lens 14, cylindrical lens 16 and convex lens 20 are referred to as the first optical system in this specification, hereinafter.

Figure 11:
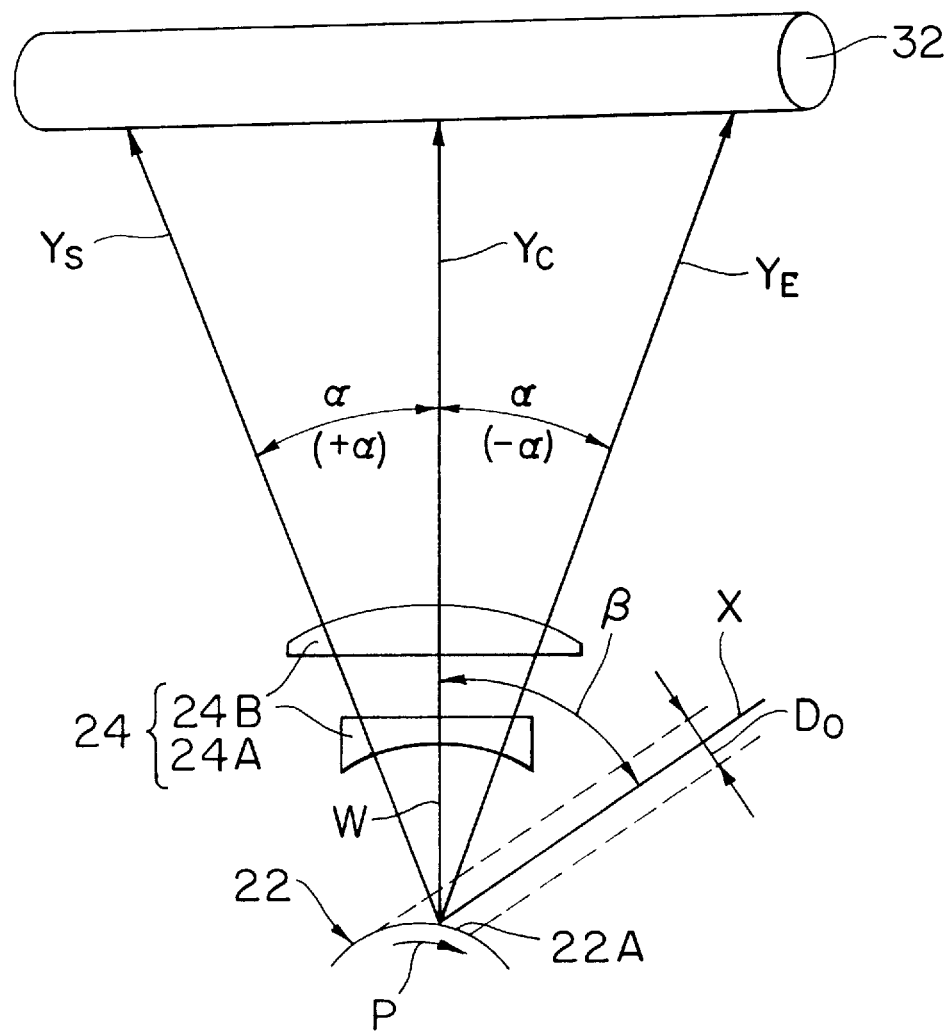
FIG. 11 is an upper surface view showing an arrangement of the second optical system and the photoreceptor drum.

For example, in this embodiment, diameter PΦ of a circle inscribed on the bottom surface of the rotational polygonal mirror 22 is 22 mm, and surface width Fa of each deflecting surface 22A is 4.68 mm. When the number of reflecting surfaces of the rotational polygonal mirror is n, surface width Fa is expressed by "Fa=PΦ×tan(180°÷n)". A central optical axis of the first optical system projected on an imaginary plane perpendicular to each of the plurality of deflecting surfaces 22A and a central optical axis of the fθ lens 24 of the first optical system form an angle β (FIG. 11). In this embodiment, the angle β is 45°. Beam width $D_0$ of a beam of light incident upon the rotational polygonal mirror 22 is approximately 10.3 mm.

Photosensitive material to be optically scanned by the optical scanning apparatus 10 described above is provided on the surface of a long cylindrical photoreceptor drum 32. This photoreceptor drum 32 is arranged below the lower surface 30D of the casing 30 in such a manner that the scanning direction expressed by arrow R coincides with the longitudinal direction of the photoreceptor drum 32. This photoreceptor drum 32 is rotated in the direction of arrow Q around rotational axis W at a constant rotational speed by a drive force supplied by a drive mechanism not shown in the drawing.

Next, operation of this embodiment will be explained.

As shown in FIGS. 10(A) and 10(B), the semiconductor laser 12 emits a beam of diffusion light in which the diffusion angle θ1 in a direction corresponding to the primary scanning direction (the upward and downward direction in FIG. 10(A)) is larger than the diffusion angle θ2 in a direction corresponding to the subsidiary scanning direction (the upward and downward direction in FIG. 10(B)). Since this semiconductor laser 12 is disposed inside the focal position of the collimator lens 14, the beam of light advances in parallel with a direction corresponding to the subsidiary scanning direction and gently diffuses in a direction corresponding to the primary scanning direction by the action of the collimator lens 14. In this way, the beam of light is diffused. When the beam of diffusion light passes through the slit 15, the beam width in the direction corresponding to the subsidiary scanning direction is restricted by the slit 15.

After the beam of light has passed through the slit 15, it is made to be a beam of convergent light by the cylindrical lens 16 in which the beam of light is converged only in the direction corresponding to the subsidiary direction. After the beam of light has passed through the cylindrical lens 16, it is reflected on the flat mirror 18 to the inside of the casing 30. Then the beam of light is made to be a parallel flux which is parallel to the direction corresponding to the primary scanning direction, and at the same time the beam of light is made to be a beam of convergent light which is converged on the deflecting surface 22A of the rotational polygonal mirror 22 in the direction corresponding to the subsidiary scanning direction. Beam width (incident luminous flux width) $D_0$ of the beam of convergent light is made to be approximately 10.3 mm in the direction corresponding to the primary scanning direction and incident upon the deflecting surface 22A of the rotational polygonal mirror 22, and at the same time, in the direction corresponding to the subsidiary scanning direction, the beam of light is converged at a position close to the deflecting surface 22A of the rotational polygonal mirror 22. At this time, surface width Fa of each deflecting surface 22A is 4.68 mm. Since surface width Fa of each deflecting surface 22A is smaller than the above beam width $D_0$, the beam of light strides over a plurality of deflecting surfaces 22A, and a linear image which is long in the primary scanning direction is formed.

After the formation of the linear image, the beam of light is reflected on the plurality of deflecting surfaces 22A and sent to the fθ lens 24 and then deflected so that the beam of light can be converged at a position close to the surface of the photoreceptor drum 32 in the primary scanning direction. After the deflected beam of light has been reflected on the flat mirror 26, it is sent to the cylindrical mirror 28. Tilt of the beam of light in the subsidiary scanning direction is corrected by the cylindrical mirror 28, and the beam of light is reflected toward the hole 30A. The reflected beam of light passes through the hole 30A and is emitted to the outside of the casing 30. In this way, the surface of the photoreceptor drum 32 is irradiated with the beam of light. At this time, by the action of the cylindrical lens 16 in the subsidiary scanning direction, and also by the action of the fθ lens in the primary scanning direction, the beam of light is converged at a position close to the surface of the photoreceptor drum 32, and the surface of the photoreceptor drum 32 is irradiated with a substantially circular spot of light, the irradiation beam diameter of which is K.

In this connection, since the rotational polygonal mirror 22 is rotated in the direction of arrow P at a substantially constant angular velocity, an advancing direction of the beam of light reflected on the deflecting surface 22A fluctuates. In accordance with the fluctuation of the advancing direction of the beam, a position of the spot of light irradiated on the surface of the photoreceptor drum 32 also fluctuates.

Fluctuation of the position of the spot of light will be explained. As shown in FIG. 11, when the beam of light is incident upon the deflecting surface 22A so that the angle β can be 45°, a central axis of the beam of light reflected on the deflecting surface 22a fluctuates between the reflecting direction $Y_S$ in the case of SOS and the reflecting direction $Y_E$ in the case of EOS by the rotation of the polygonal mirror 22. As shown in FIG. 11, the reflecting direction $Y_S$ and the reflecting direction $Y_E$ are respectively shifted from the reflecting direction $Y_C$ by an equal angle (the maximum deflecting angle α), wherein the reflecting direction $Y_C$ overlaps with the central optical axis W of the fθ lens 24 when it is projected in a direction perpendicular to the surface of the drawing. In this embodiment, the maximum deflecting angle α is set at ±21°.

Further, since the rotational polygonal mirror 22 is rotated in the direction of arrow P at a substantially constant angular velocity, the central axis of the beam of light reflected on the deflecting surface 22A is moved from the reflecting direction $Y_S$ to the direction of arrow P at a substantially constant angular velocity. When the central axis of the beam of light reaches the reflecting direction $Y_E$, it returns to the reflecting direction $Y_S$, and it is moved again in the direction of arrow P at a substantially constant angular velocity.

Due to the foregoing, in FIG. 9, a spot of light irradiated on the photoreceptor drum 32 is moved on the photoreceptor drum 32 in the direction of arrow R from position $L_S$ in the case of SOS to position $L_E$ in the case of EOS passing through a locus illustrated by a broken line N. Then the spot of light irradiated on the photoreceptor drum 32 is returned to position $L_S$. The spot of light repeats the above movement. At this time, the spot of light is moved on the photoreceptor drum 32 at a substantially constant speed by the lens power of the fθ lens 24.

As described before, the photoreceptor drum 32 rotates around axis W in the direction of arrow Q at a predetermined rotational speed. Due to the rotation of the photoreceptor drum 32 at a constant speed and also due to the movement of the spot of light in the direction of arrow R at a substantially equal speed, magnetic information recorded on the surface of the photoreceptor drum 32 can be scanned at a predetermined scanning speed.

As described above, in this embodiment, the first optical system, rotational polygonal mirror 22 and fθ lens 24 are arranged in such a manner that the maximum deflecting angle α is ±21° and the angle β is 45°. Accordingly, the conditional expressions about the maximum deflecting angle α and the angle β $(\cos((\beta+\alpha)\div 2))\div(\cos((\beta-\alpha)\div 2))\geq 0.75)$ are satisfied (cos 33°÷cos 12°≈ 0.858≧0.75), and the maximum deflection angle a is not less than 15° and the angle β is not less than 30°. In this case, a difference between F-number of the right and F-number of the left is approximately 0.858, that is, a difference between F-number of the right and F-number of the left does not reach 0.9. However, as described before, while the diameter of the rotational polygonal mirror 22 is prevented from increasing, it is possible to restrict the fluctuation of the beam diameter of the luminous flux irradiated on the photoreceptor drum 32 in an allowable range, so that image quality can be maintained at a predetermined level.

Further, as shown in FIGS. 10(A) and 10(B), in this embodiment, the semiconductor laser 12 is disposed inside the focal position of the collimator lens 14. Accordingly, a beam of light emergent from the collimator lens 14 in the primary scanning direction diverges. Width of the beam of light in a direction corresponding to the primary scanning direction can be adjusted to be a predetermined width when the interval $I_1$ between the semiconductor laser 12 and the collimator lens 14 and the interval $I_2$ between the collimator lens 14 and the convex lens 20 are respectively adjusted.

On the other hand, this beam of light is made to converge in a direction corresponding to the subsidiary scanning direction by the cylindrical lens 16 and the convex lens 20. Width of the beam of light in a direction corresponding to the subsidiary scanning direction is adjusted in the following manner. After the width of the beam of light in a direction corresponding to the primary scanning direction has been adjusted, the interval $I_3$ between the cylindrical lens 16 and the rotational polygonal mirror 22 is adjusted so that the beam of light emergent from the collimator lens 14 can be converged at a position close to the deflecting surface 22A of the rotational polygonal mirror 22. As can be seen in FIGS. 10(A) and 10(B), the interval for adjusting the width of the beam of light in a direction corresponding to the primary scanning direction (interval $I_1$ between the semiconductor laser 12 and the collimator lens 14, and interval $I_2$ between the collimator lens 14 and the convex lens 20), and the interval for adjusting the width of the beam of light in a direction corresponding to the subsidiary scanning direction (interval $I_3$ between the cylindrical lens 16 and the rotational polygonal mirror 22) overlap with each other between the cylindrical lens 16 and the convex lens 20. However, even in this embodiment, it is possible to independently conduct the adjustment of the width of the beam of light in the direction corresponding to the primary scanning direction and the adjustment of the width of the beam of light in the direction corresponding to the subsidiary scanning direction.

In the conventional lens arrangement in which the intervals for adjusting the widths corresponding to the directions of the primary and the subsidiary scanning direction do not overlap with each other. Compared with the above conventional lens arrangement, it is possible to reduce an optical path length from the light source to the rotational polygonal mirror in the lens arrangement of the present invention. Also, the optical path length from the light source to the rotational polygonal mirror of the first optical system of this embodiment is approximately ½ as short as that of the optical system in which the collimator lens, convex lens and cylindrical lens are disposed in this order.

Conventionally, the semiconductor laser 12 is arranged at a position which coincides with the focal position of the collimator lens 14, and a beam of divergent light emergent from the semiconductor laser 12 is made to be a parallel luminous flux by the collimator lens 14. On the other hand, in the embodiment of the present invention, the semiconductor laser 12 is arranged inside the focal position of the collimator lens 14. Due to the foregoing, the aperture of the collimator lens 14 can be made smaller than that of the conventional one. Accordingly, it is not necessary to use an expensive collimator lens of a large aperture, that is, it is possible to use a collimator lens of an intermediate aperture, so that the cost of the component can be reduced.

Figure 12A:
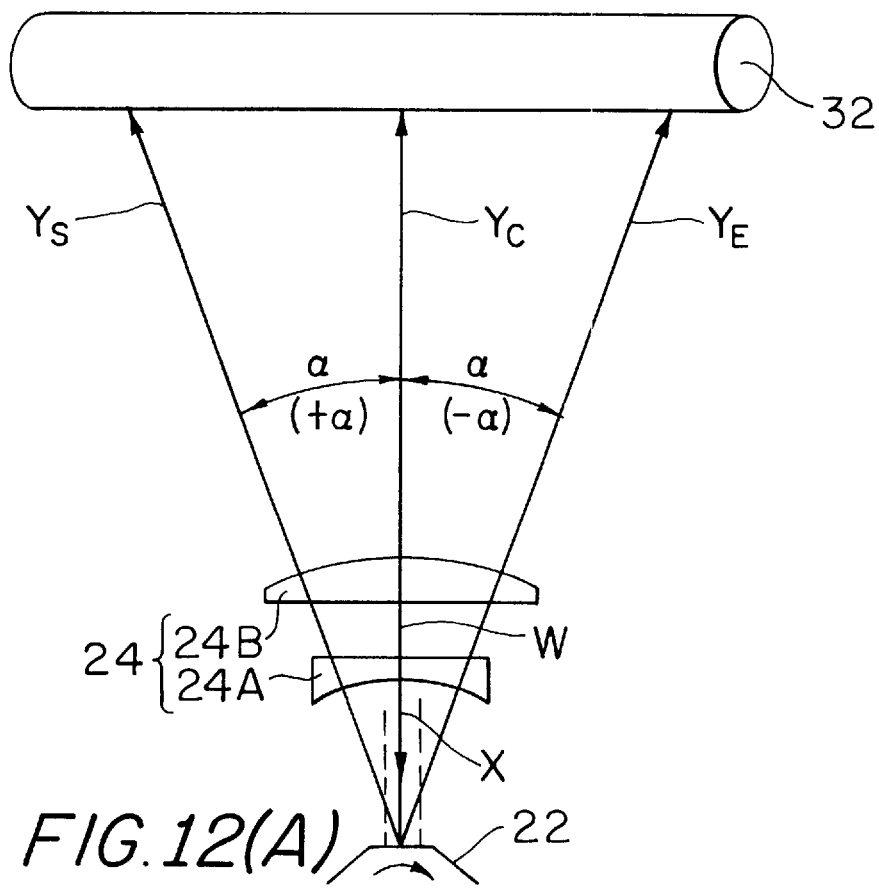
FIG. 12(A) is an upper surface view showing an arrangement of the second optical system and the photoreceptor drum in the case of the incident angle $\beta = 0°$.

In this embodiment, a central optical axis of the first optical system projected on an imaginary plane perpendicular to each of the plurality of deflecting surfaces 22A and a central optical axis of the fθ lens 24 of the first optical system form an angle β which is determined to be 45°. In this way, the first optical system, rotational polygonal mirror 22 and fθ lens are arranged in this embodiment. However, when the first optical system, rotational polygonal mirror 22 and fθ lens 24 are arranged so that another condition of $\cos(\alpha \div 2) \geq 0.8$ can be satisfied, it is possible to arrange the first optical system, rotational polygonal mirror 22 and fθ lens 24 so that the condition of β=0° can be satisfied as shown in FIG. 12(A).

Figure 12B:
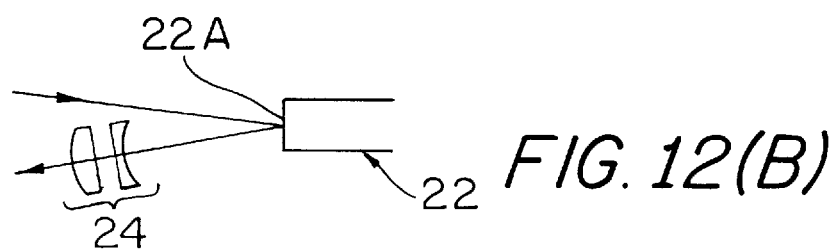
FIGS. 12(B) and 12(C) are side views showing an arrangement of the second optical system shown in FIG. 12(A).
Figure 12C:
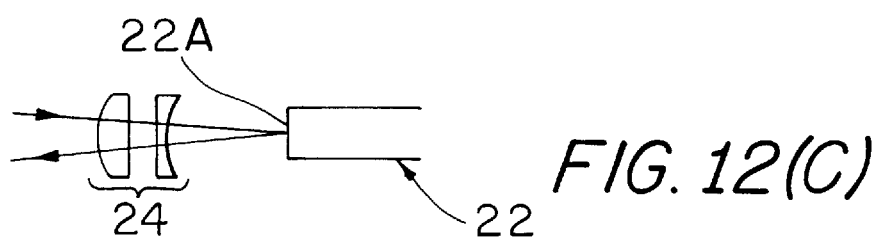

For example, as shown in FIG. 12(B), the first optical system, rotational polygonal mirror 22 and fθ lens 24 may be arranged in such a manner that their positions are shifted in the subsidiary scanning direction (the upward and downward direction in FIG. 12(B)) so that only a beam of light deflected on the deflecting surface 22A of the rotational polygonal mirror 22 can be transmitted through the fθ lens 24. As shown in FIG. 12(C), the first optical system, rotational polygonal mirror 22 and fθ lens 24 may be arranged in such a manner that their positions are a little shifted in the subsidiary scanning direction (the upward and downward direction in FIG. 12(C)) so that a beam of light incident upon the deflecting surface 22A and a beam of light deflected on the deflecting surface 22A can be transmitted through the fθ lens 24. When the first optical system, rotational polygonal mirror 22 and fθ lens 24 are arranged so that the angle β can be 0°, it is possible to downsize the optical scanning apparatus.

This embodiment uses a convex lens 20, the lens power of which is provided in both directions corresponding to the primary and the subsidiary scanning direction. However, instead of the convex lens 20, it is possible to use a cylindrical lens, the lens power of which is provided only in the direction corresponding to the primary scanning direction.

Next, uniformity of a quantity of light distributed on the surface of the photoreceptor in the above embodiment will be explained.

When a ratio of the size of the reflecting surface in the rotational direction to the size of the luminous flux emitted by the first optical system in a direction corresponding to the primary scanning direction is lower than 1.5, uniformity of the distribution of a quantity of light is remarkably deteriorated in a region from the scanning start position (SOS) to the scanning end position (EOS) on the photoreceptor. As a result, a clear difference of outputted density can be visually recognized.

When a ratio of the size of the reflecting surface in the rotational direction to the size of the luminous flux emitted by the first optical system in a direction corresponding to the primary scanning direction is higher than 4.0, the transmission factor of the overall optical system is lowered. Accordingly, when a common inexpensive light source is used, the transmission factor of the overall optical system is lowered by the contamination caused by dust, and further sensitivity of the photoreceptor is lowered at low temperatures. Due to the above problems, printing can not be carried out.

Figure 7:
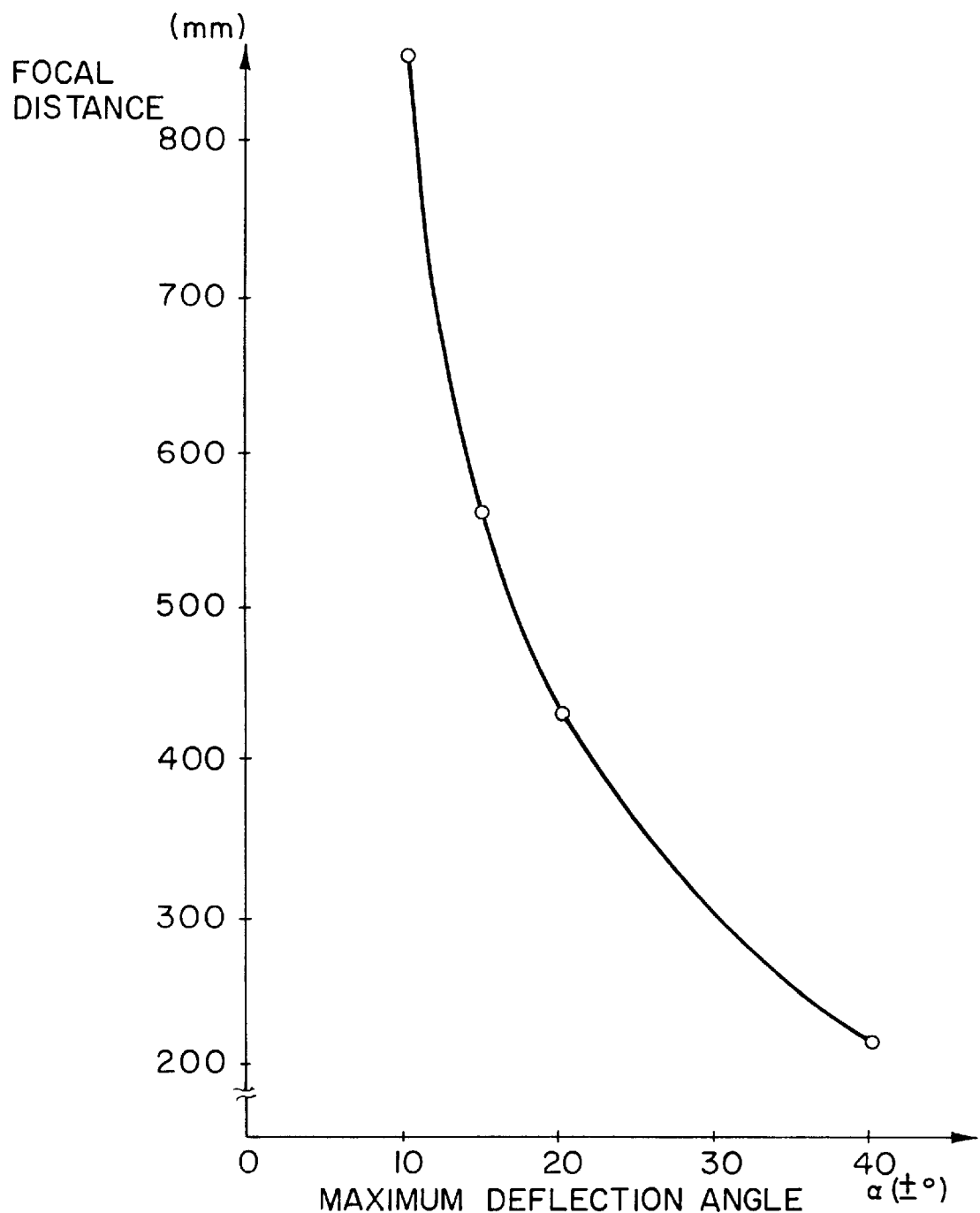
FIG. 7 is a diagram showing a relation between the maximum deflecting angle $\alpha$ and the focal distance f.

As shown in FIG. 7, when the scanning width on the photoreceptor is 297 mm which corresponds to the length of the short side of a commonly used sheet of paper of size A3, and when an angle formed between both outermost edge portions of the deflected luminous flux is smaller than 30°, in other words, when the scanning half angle is smaller than 15°, it is necessary that the focal distance is not less than 550 mm, which increases the dimensions of the image recording apparatus.

On the other hand, when the angle (scanning angle) formed between both outermost edge portions of the deflected luminous flux exceeds 60°, it is very difficult to design the second optical system so that all optical characteristics such as an fθ characteristic and a curvature of field can be put into practical use in which the deformation of an image and difference between output densities can not be clearly recognized.

When an angle formed between a projection line obtained when the optical axis of the first optical system is projected on a plane including both outermost edge portions of the deflected luminous flux and a straight line for equally dividing an angle formed between both outermost edge portions of the deflected luminous flux into 2 is not less than 90°, uniformity of the optical characteristics is remarkably deteriorated in a region from the scanning start position (SOS) to the scanning end position (EOS). Therefore, the above case in which the incident angle is not less than 90° is not preferable.

Figure 13:
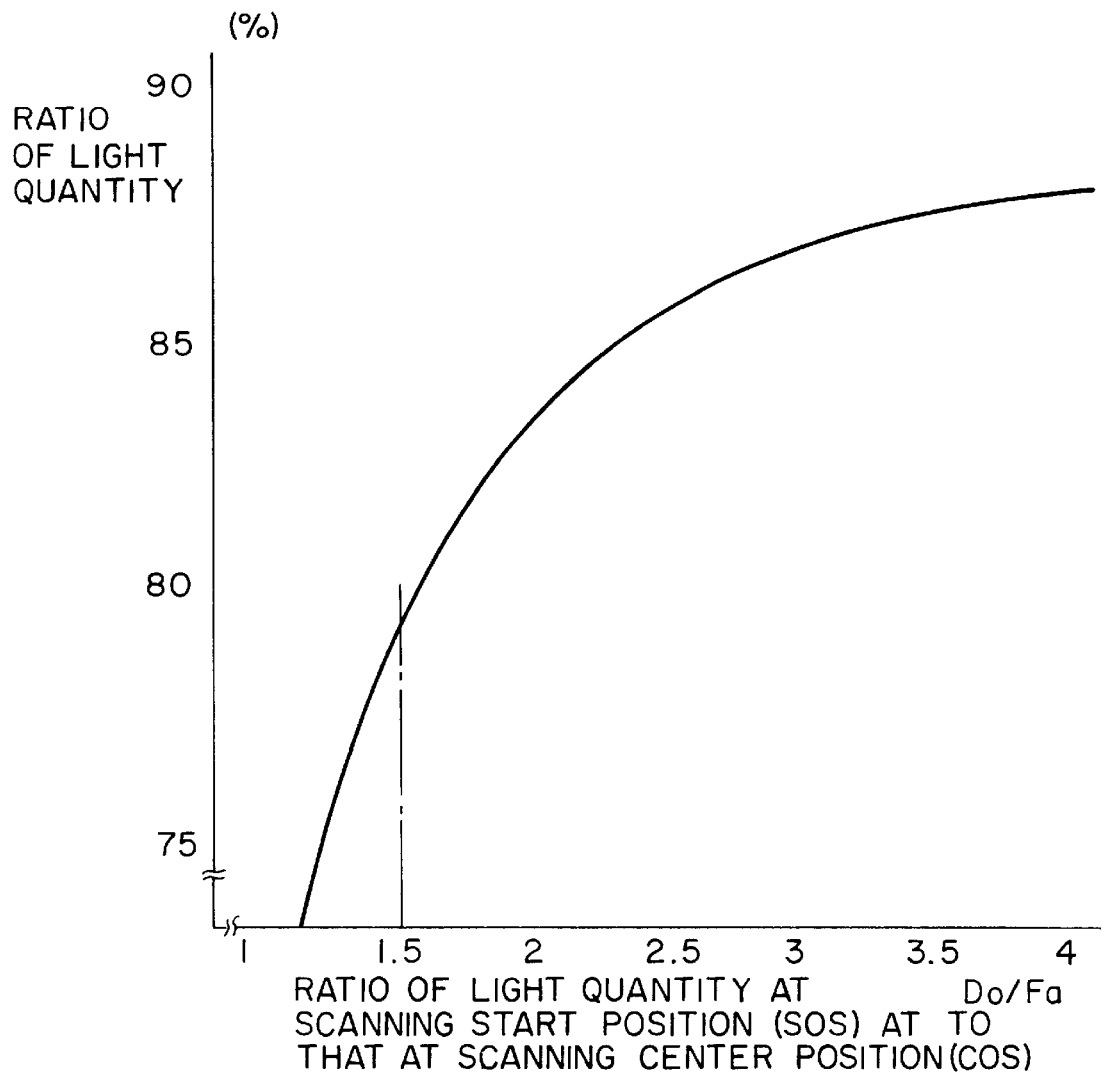
FIG. 13 is a graph showing a relation between the incident luminous flux width ($D_0/Fa$) with respect to the surface width of the rotational polygonal mirror and the ratio of a quantity of light at the scanning start position and a quantity of light at the scanning center position.
Figure 14:
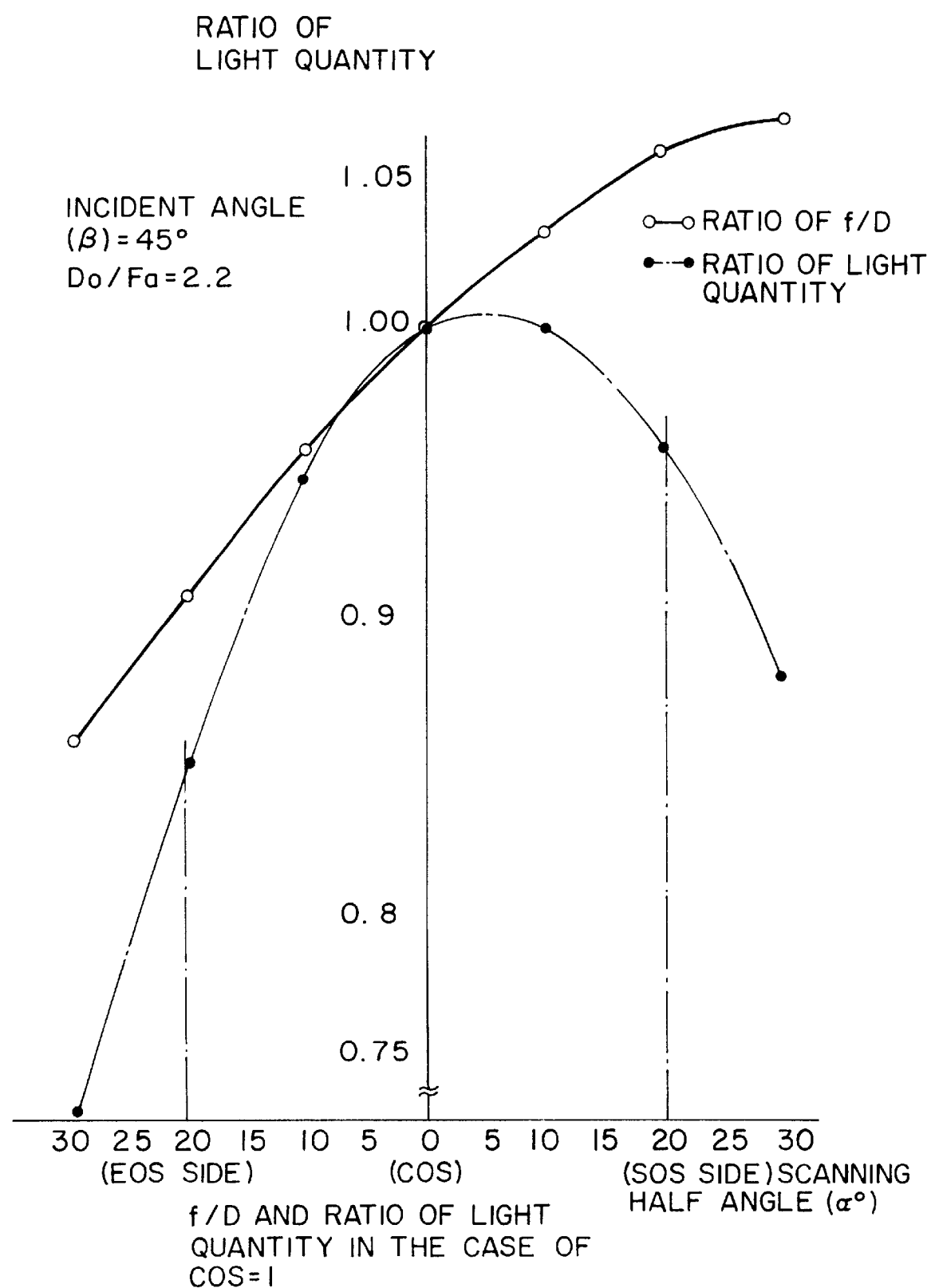
FIG. 14 is a graph showing a relation between the scanning half angle and the ratio of f/D and also showing a relation between the scanning half angle and the ratio of a quantity of light in the case where the value of the scanning center position is 1, wherein the incident angle is 45° and $D_0/Fa$ is 2.2.

FIG. 13 is a graph showing a relation between a ratio of a quantity of light at the scanning start position (SOS) to a quantity of light at the scanning center position (COS) and a ratio ($D_0$/Fa) of the incident luminous flux width to the face width of the reflecting surface of the rotational polygonal mirror. In this case, the incident angle (β) is 45°, the scanning half angle (±α) is 21°, and the focal distance of the fθ lens is 286.5 mm. FIG. 14 is a graph showing a relation between the scanning half angle and the ratio of f/D in the case where the luminous flux is incident upon the rotational polygonal mirror from the side of EOS, wherein the incident angle is 45° and $D_0$/Fa is 2.2. Also, FIG. 14 is a graph showing a relation between the scanning half angle and the ratio of a quantity of light. In the optical scanning apparatus 10 of this embodiment, as described above, the ratio $D_0$/Fa of the incident luminous flux width $D_0$ incident upon the rotational polygonal mirror 34 to the surface width Fa of the reflecting surface of the rotational polygonal mirror is 2.2 (10.3/4.68), the incident angle β is 45°, and the scanning half angle "a" is ±21°. Accordingly, as can be seen in these graphs, uniformity of the distribution of a quantity of light can be maintained at about 84% over the scanning start position (SOS), the scanning center position (COS) and the scanning end position (EOS).

Figure 15:
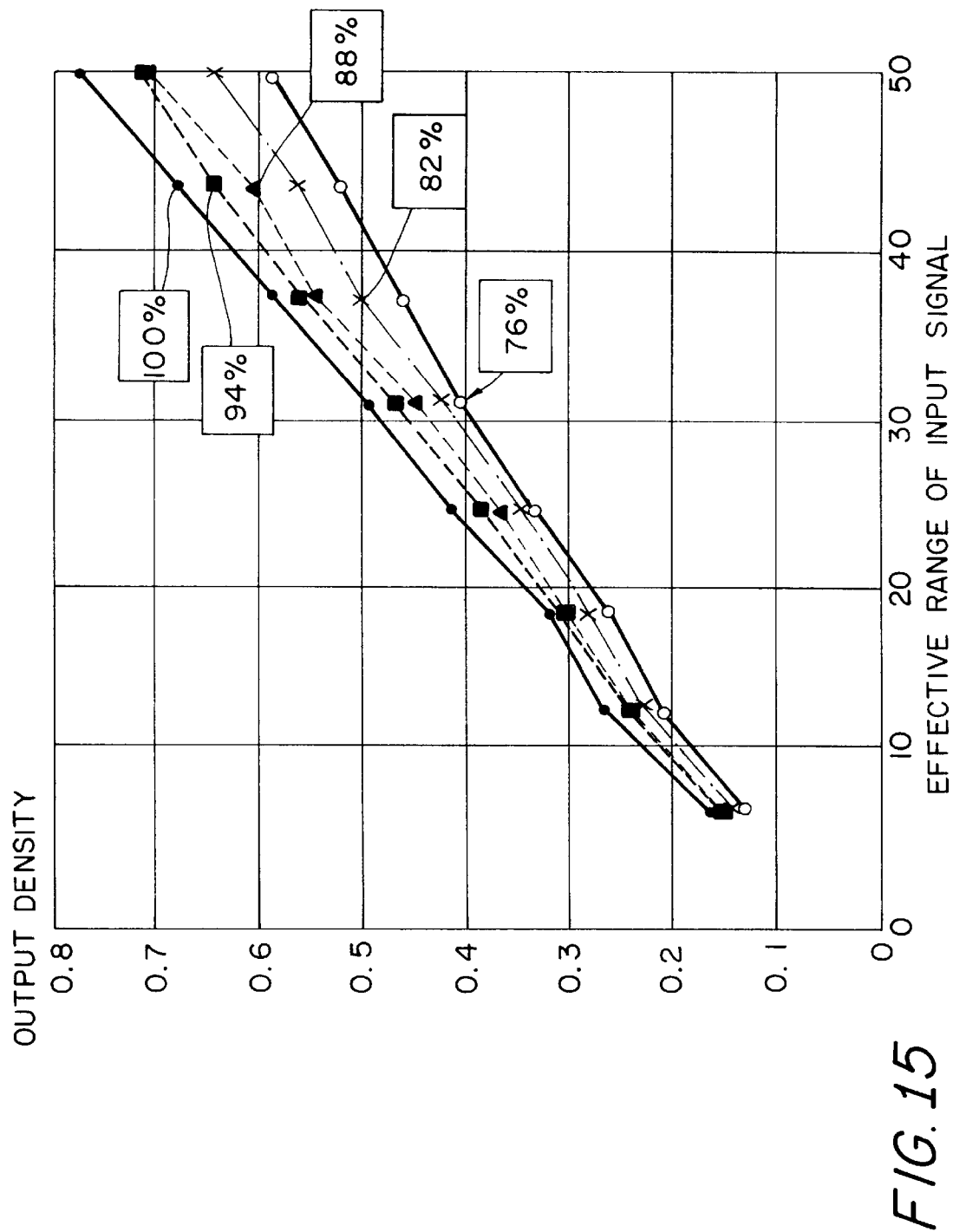
FIG. 15 is a graph showing a relation between the coverage of an input signal and the output density and also showing a relation between the coverage of an input signal and the ratio of a quantity of light at the scanning start position and a quantity of light at the scanning center position.

FIG. 15 is a graph showing a relation between the coverage of an input signal which is an index of the density of half tone, and the ratio of the output density to the quantity of light. Even when the coverage of an input signal exceeds 30%, the ratio of the quantity of light can be made to be not less than 80% in this embodiment. Accordingly, as compared with a case in which the ratio of the quantity of light accomplished by the underfilled type optical scanning apparatus is 100%, the difference of output density can be made to be smaller than 0.1. When the difference of output density is not less than 0.1 in the case where the coverage of an input signal is 30 to 50%, in general, the difference of density can be visually discriminated. However, in this embodiment, it is possible to avoid the visual discrimination of the difference of density.

As described above, according to this embodiment, without increasing the unit rotational speed of the rotational polygonal mirror and without increasing the diameter of the rotational polygonal mirror, it is possible to avoid the deterioration of uniformity of the distribution of a quantity of light, and further it is possible to suppress the difference of output density so that it can not be visually discriminated clearly. Consequently, it is possible to provide an optical scanning apparatus in which images of high resolution can be formed at high speed.

Figure 16:
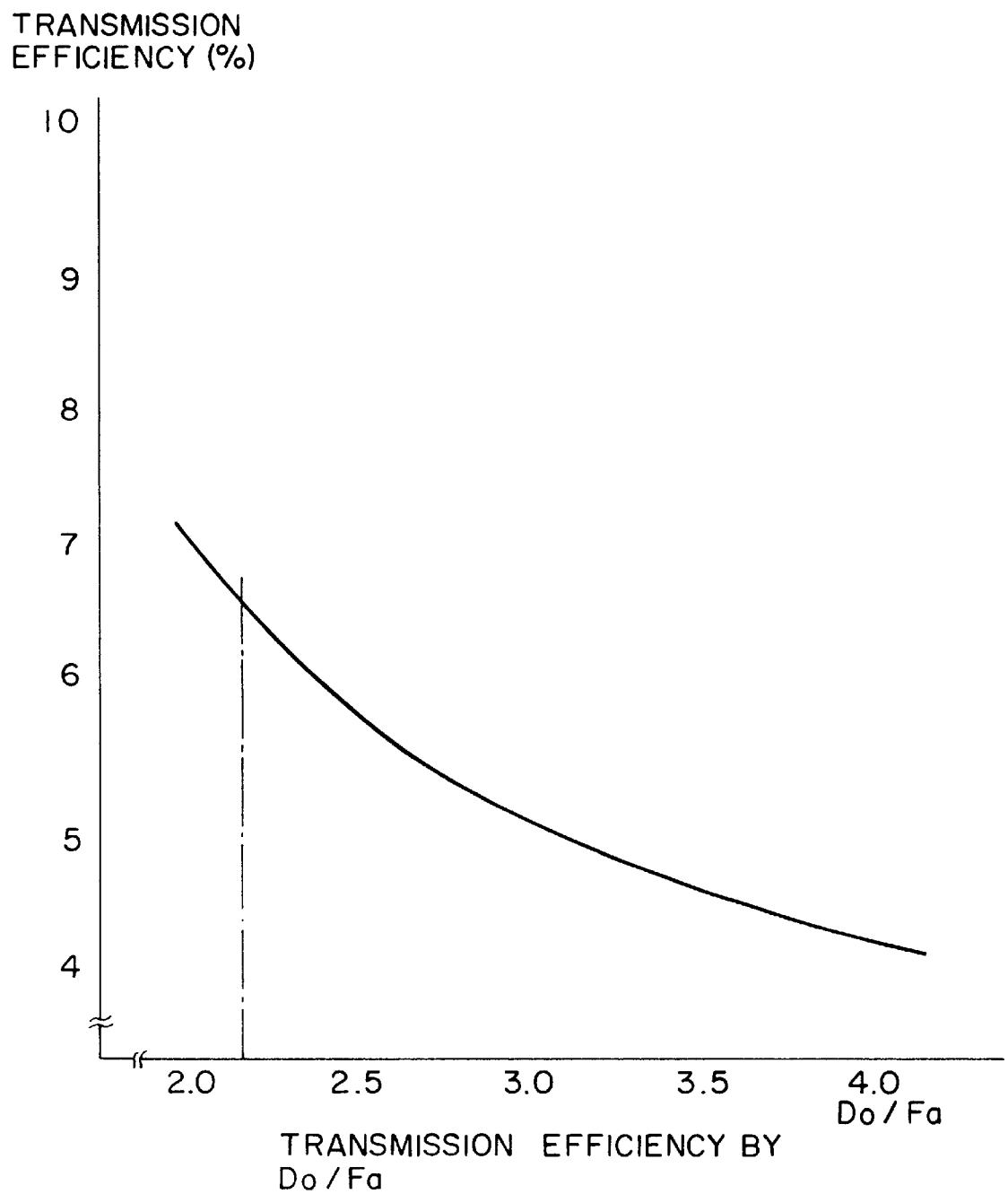
FIG. 16 is a graph showing a relation between the incident luminous flux width ($D_0/Fa$) with respect to the surface width of the rotational polygonal mirror and the transmission efficiency.
Figure 17:
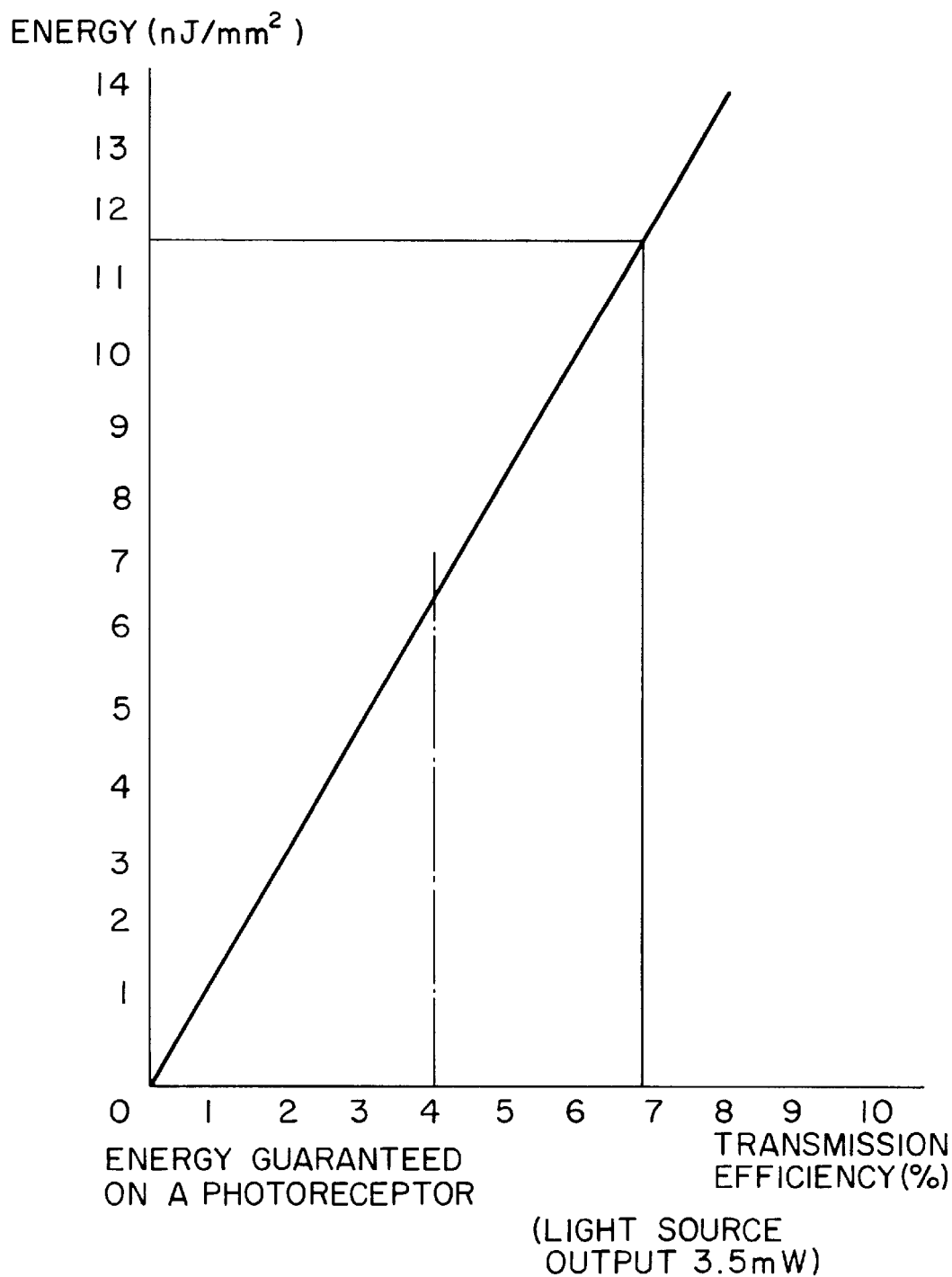
FIG. 17 is a graph showing a relation between the intensity of energy guaranteed on the photoreceptor and the transmission efficiency.

FIG. 16 is a graph showing a relation between the transmission efficiency of the entire optical system and the ratio $D_0/Fa$. FIG. 17 is a graph showing a relation between the intensity of energy guaranteed on the photoreceptor and the transmission efficiency. As shown in FIG. 16, in the case of $D_0/Fa=2.2$, the transmission factor of the entire optical system is 6.8%. When a semiconductor laser of 5 mW, the practical available range of which is 3.5 mW, is used for a light source, as shown in FIG. 17, when the transmission factor is 6.8%, the intensity of energy capable of being supplied onto the photoreceptor is 11.6 $nJ/mm^2$. When the transmission factor of the entire optical system is lowered to 60% by the contamination caused by dust, in the case where the sensitivity of the photoreceptor is lowered to 50% at low temperatures, in order to guarantee the intensity 2 $nJ/mm^2$ of energy which is the minimum value to conduct printing, it is necessary to supply energy, the intensity of which is not less than 6.7 $nJ/mm^2$ onto the photoreceptor. When energy is supplied onto the photoreceptor, the intensity of which is 11.6 $nJ/mm^2$ as described above, it is possible to conduct printing even if the transmission factor of the entire optical system is lowered by the contamination of dust or alternatively even if the sensitivity of the photoreceptor is lowered at low temperatures. Therefore, in this embodiment, it is possible to use an inexpensive semiconductor of 5 mW as a light source.

In the above embodiment, the interval between the semiconductor laser 12, which is a light source, and the collimator lens 14 is determined so that the image formation performance can not be affected and a laser beam, the width of which is wide in a direction corresponding to the primary scanning direction, can be obtained without requiring a long distance from the collimator lens 14 to the image forming position. Specifically, this interval is determined by experiments. Also, the interval between the collimator lens 14 and the convex lens 20 and the interval between the cylindrical lens 16 and the rotational polygonal mirror 22 are determined by experiments.

In the above embodiment, the collimator lens, cylindrical lens, convex lens and fθ lens may be made of glass, plastics or other suitable materials.

In the above embodiment, the convex lens 20 is used, the lens power of which is provided in both directions corresponding to the primary and the subsidiary scanning direction. Instead of this convex lens 20, it is possible to use a cylindrical lens, the lens power of which is provided only in a direction corresponding to the primary scanning direction.

In the above embodiment, the luminous flux incident upon the rotational polygonal mirror is parallel with a direction corresponding to the primary scanning direction, however, the luminous flux incident upon the rotational polygonal mirror may be a beam of divergent light in the direction corresponding to the primary scanning direction.

Figure 18:
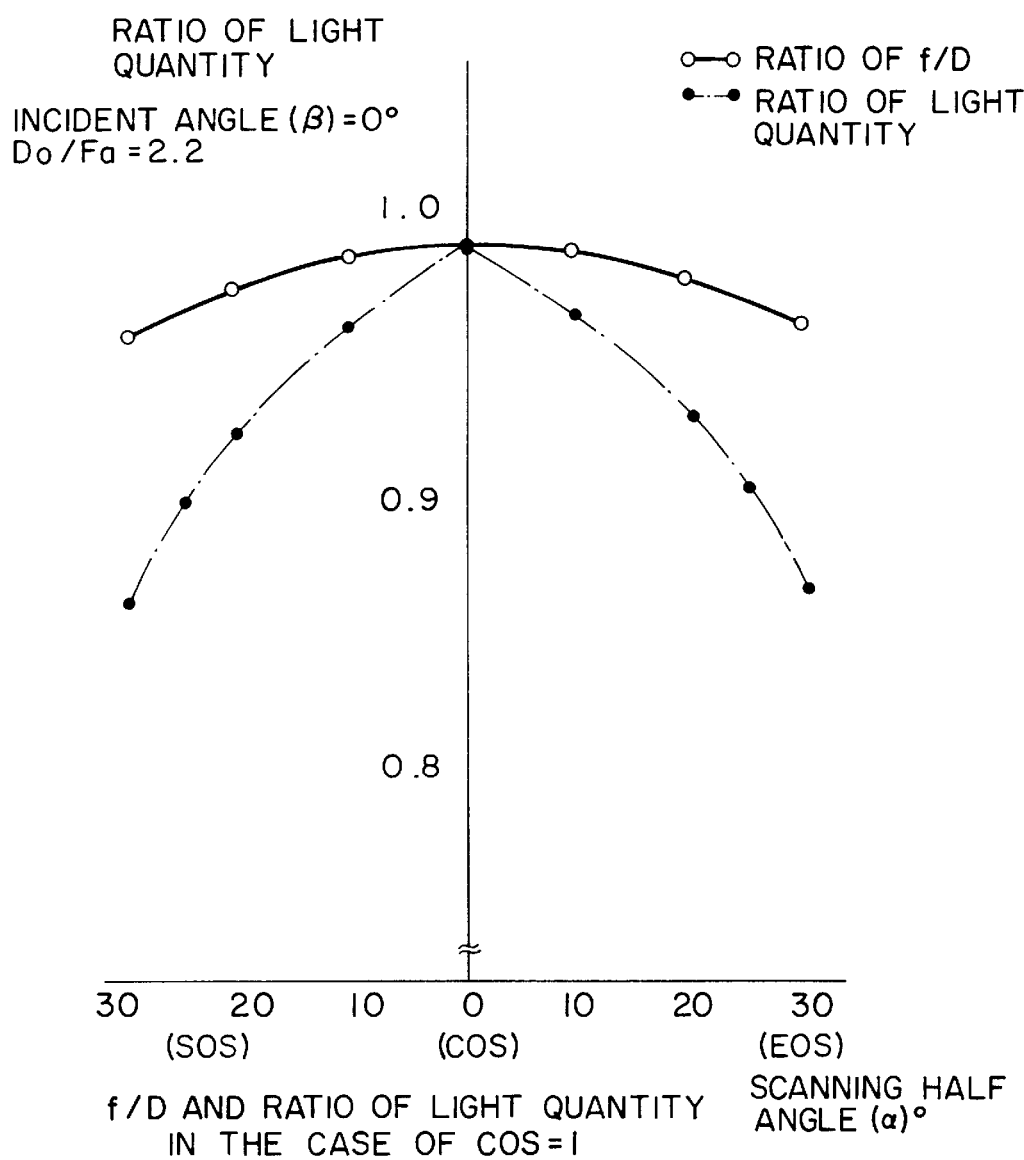
FIG. 18 is a graph showing a relation between the scanning half angle and the ratio of f/D and also showing a relation between the scanning half angle and the ratio of a quantity of light, wherein the incident angle $\beta$ is 0° and $D_0/Fa$ is 2.2.
Figure 19A:
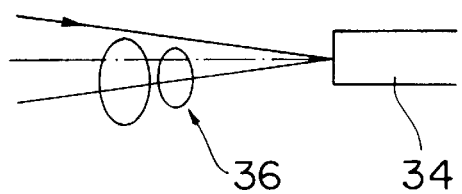
FIGS. 19(A) and 19(B) are side views showing examples in which the incident angle $\beta$ becomes 0.
Figure 19B:
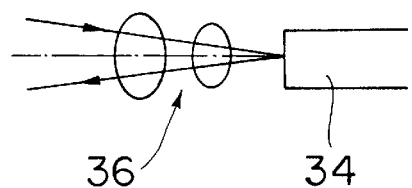

FIG. 18 is a graph showing a relation between the scanning half angle and the ratio of f/D in the case where the luminous flux is incident upon the rotational polygonal mirror from the side of EOS, wherein the incident angle is 0° and $D_0/Fa$ is 2.2. Also, FIG. 10 is a graph showing a relation between the scanning half angle and the ratio of a quantity of light. As can be seen in the graph, when the incident angle is 0°, even if the scanning half angle is large, it is possible that a ratio of the quantity of light can be increased to a value not less than 80%. As can be seen in FIGS. 14 and 18, the incident angle β and the scanning angle are related to each other, and there is a tendency that the scanning angle is reduced as the incident angle β is increased. Specifically, when the incident angle is 0°, it is possible to make the scanning angle to be not more than 60°, and when the incident angle is 45°, it is possible to make the scanning angle to be not more than 50°. When the incident angle is close to 90°, the scanning angle is not more than 30°. In this connection, in order to make the incident angle to be 0°, it is necessary that a projection line obtained when the optical axis of the cylindrical lens 16 is projected on a plane including both outermost edge portions of the deflected luminous flux overlaps with a straight line for equally dividing an angle formed between both outermost edge portions of the deflected luminous flux into 2 as shown in FIG. 19(A) or 19(B). When the incident angle is 0°, it is necessary to prevent the deterioration of other performance such as a curve of the scanning line.

As described above, according to the invention, the following excellent effects can be provided.

That is, according to the first aspect of the present invention, it is possible to avoid an increase in the diameter of the rotational polygonal mirror and also it is possible to restrict a range of fluctuation of the beam diameter of the luminous flux irradiated on a plane to be scanned, in an allowable range.

Further, when the value of angle β is determined to be 0°, it is possible to downsize the optical scanning apparatus.

Still further, it is possible to reduce the length of an optical path from the light source to the rotational polygonal mirror for obtaining a luminous flux, the incident beam width of which is wider than the surface width of the reflecting surface of the rotational polygonal mirror.

Still further, when the ratio of the size of the reflecting surface in the rotational direction to the size of the luminous flux in a direction corresponding to the primary scanning direction, the luminous flux being emitted by the first optical system, is not less than 1.5 and not more than 4.0, the angle formed by both outermost edge portions of the deflected luminous flux is not less than 30° and not more than 60°, and the angle formed between a projection line obtained when the optical axis of the first optical system is projected on a plane including both outermost edge portions of the deflected luminous flux and a straight line for equally dividing an angle formed between both outermost edge portions of the deflected luminous flux into 2 is smaller than 90°, in the overfilled type optical scanning apparatus, it is possible to avoid an increase in the diameter of the rotational polygonal mirror, and it is possible to reduce the deterioration of uniformity of the distribution of a quantity of light on the photoreceptor.

What is claimed is:
1. An optical scanning apparatus, comprising:
a light source;
a rotational polygonal mirror having a plurality of reflecting surfaces parallel with a rotational axis, a luminous flux emergent from said light source being deflected on said reflecting surfaces in a predetermined direction at a substantially constant angular velocity;
a first optical system for forming the luminous flux emergent from said light source into a linear image which is long in a direction corresponding to a primary scanning direction in such a manner that said linear image strides said reflecting surfaces of said rotational polygonal mirror; and a second optical system for converging the deflected luminous flux upon a surface to be scanned so that scanning can be conducted by a spot of light at a substantially constant speed, wherein said first optical system, said rotational polygonal mirror and said second optical system are composed to satisfy the following expressions:

$$\beta = 0° \text{ and } \cos(\alpha \div 2) \geq 0.8$$

where $\alpha$ is a maximum deflection angle of the deflected luminous flux with respect to an optical axis of said second optical system, and $\beta$ is an angle formed between an optical axis of said first optical system projected on a plane substantially perpendicular to each of said reflecting surfaces of said rotational polygonal mirror, and the optical axis of said second optical system.

2. The optical scanning apparatus according to claim 1, said first optical system including:

a collimator lens arranged in an emergent direction of said light source;

a subsidiary scanning direction adjusting lens arranged on the emergent side of said collimator lens, said subsidiary scanning direction adjusting lens having a lens power in a direction corresponding to the subsidiary scanning direction of the luminous flux emergent from said collimator lens; and a primary scanning direction adjusting lens arranged on the emergent side of said subsidiary scanning direction adjusting lens, said primary scanning direction adjusting lens having a lens power in a direction corresponding to the primary scanning direction of the luminous flux emergent from said subsidiary scanning direction adjusting lens, wherein said light source is arranged inside a focal position of said collimator lens.

* * * * *

UNITED STATES PATENT AND TRADEMARK OFFICE
CERTIFICATE OF CORRECTION

PATENT NO. : 5,774,251
DATED : June 30, 1998
INVENTOR(S) : Yoshihito SEKIKAWA

It is certified that error appears in the above-identified patent and that said Letters Patent is hereby corrected as shown below:

Title Page, Item [57], in the Abstract, line 18, "$\theta$" should read --$f\ \theta$-- .

Signed and Sealed this

Seventh Day of March, 2000

*Attest:*

Q. TODD DICKINSON

*Attesting Officer*   *Commissioner of Patents and Trademarks*